(12) United States Patent
Takagi et al.

(10) Patent No.: US 7,664,129 B2
(45) Date of Patent: Feb. 16, 2010

(54) WIRELESS COMMUNICATION METHOD AND APPARATUS

(75) Inventors: Masahiro Takagi, Tokyo (JP); Tomoko Adachi, Urayasu (JP); Tetsu Nakajima, Yokohama (JP); Yoriko Utsunomiya, Tokyo (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1043 days.

(21) Appl. No.: 11/071,556

(22) Filed: Mar. 4, 2005

(65) Prior Publication Data

US 2005/0208956 A1 Sep. 22, 2005

(30) Foreign Application Priority Data

| Mar. 5, 2004 | (JP) | ............................... 2004-063238 |
| May 28, 2004 | (JP) | ............................... 2004-160177 |
| Aug. 23, 2004 | (JP) | ............................... 2004-242893 |

(51) Int. Cl.
*H04J 3/16* (2006.01)

(52) U.S. Cl. ....................................... 370/437; 370/465

(58) Field of Classification Search ................. 370/395, 370/433, 455, 465, 466, 431, 437
See application file for complete search history.

(56) References Cited

U.S. PATENT DOCUMENTS

2003/0103521 A1 6/2003 Raphaeli et al.

| 2004/0052273 A1* | 3/2004 | Karaoguz et al. ........... 370/465 |
| 2004/0264475 A1* | 12/2004 | Kowalski .................. 370/395.5 |

FOREIGN PATENT DOCUMENTS

| JP | 2003-87856 | 3/2003 |
| JP | 2003-101506 | 4/2003 |
| JP | 2004-48539 | 2/2004 |
| JP | 2004-525586 | 8/2004 |
| JP | 2005-530395 | 10/2005 |

OTHER PUBLICATIONS

U.S. Appl. No. 11/557,636, filed Nov. 8, 2006, Takagi, et al.
U.S. Appl. No. 11/385,736, filed Mar. 22, 2006, Utsunomiya, et al.
U.S. Appl. No. 11/857,841, filed Sep. 19, 2007, Utsunomiya, et al.

* cited by examiner

*Primary Examiner*—Jason E Mattis
*Assistant Examiner*—Dady Chery
(74) *Attorney, Agent, or Firm*—Oblon, Spivak, McClelland, Maier & Neustadt, L.L.P.

(57) ABSTRACT

A wireless communication apparatus includes a carrier sense device which determines whether or not the first channel satisfies a specific condition of the determination of an idle state, and an occupation/release control device which performs control to make the first physical layer protocol processing device generate and transmit a first frame which declares that the first channel will be occupied for a first predetermined period by virtual carrier sense, when the specific condition of the determination of the idle state is satisfied, and perform control to make the second physical layer protocol processing device generate and transmit a second frame which declares that the second channel will be occupied for a second predetermined period by virtual carrier sense.

26 Claims, 18 Drawing Sheets

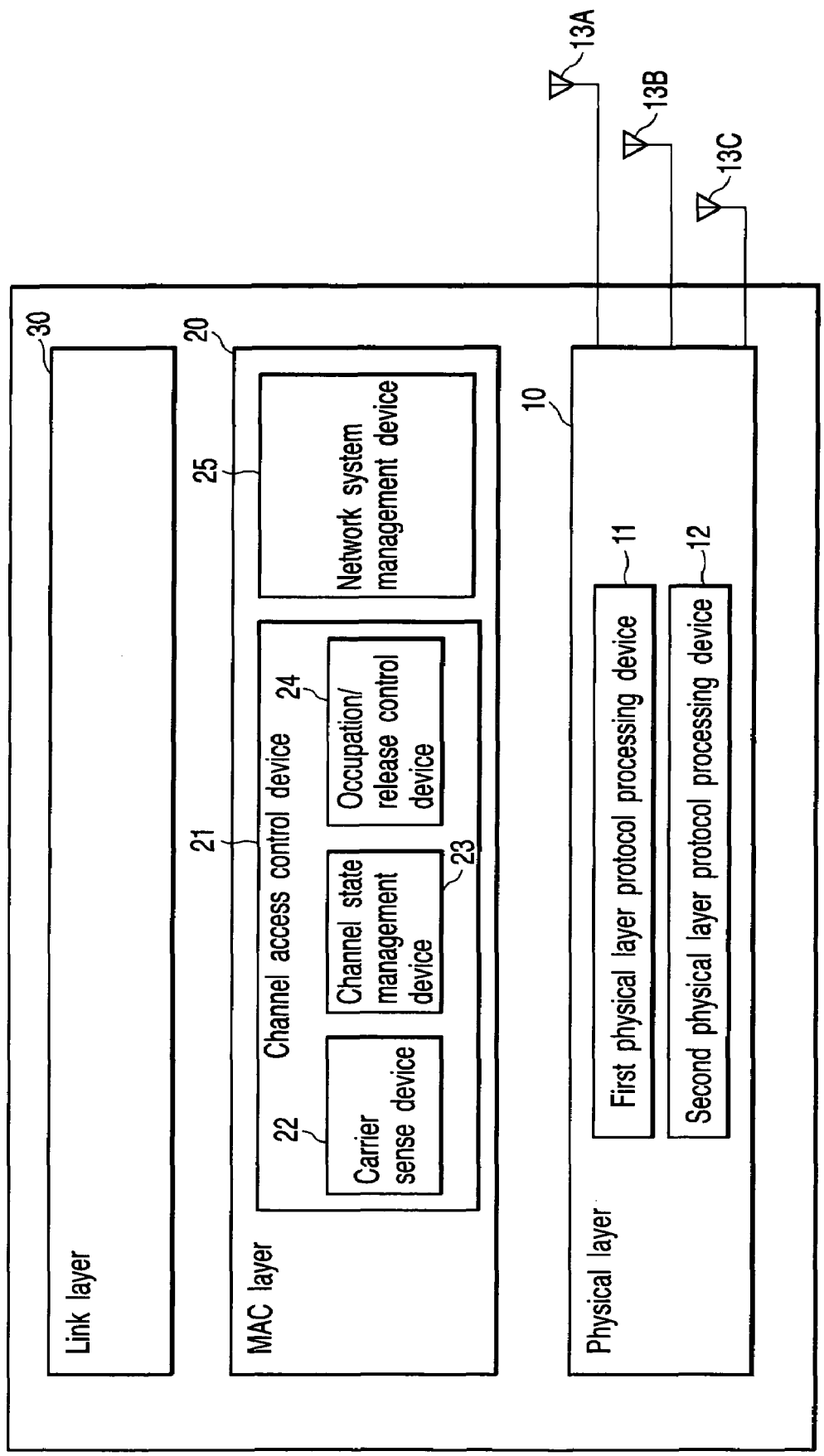
F I G. 1

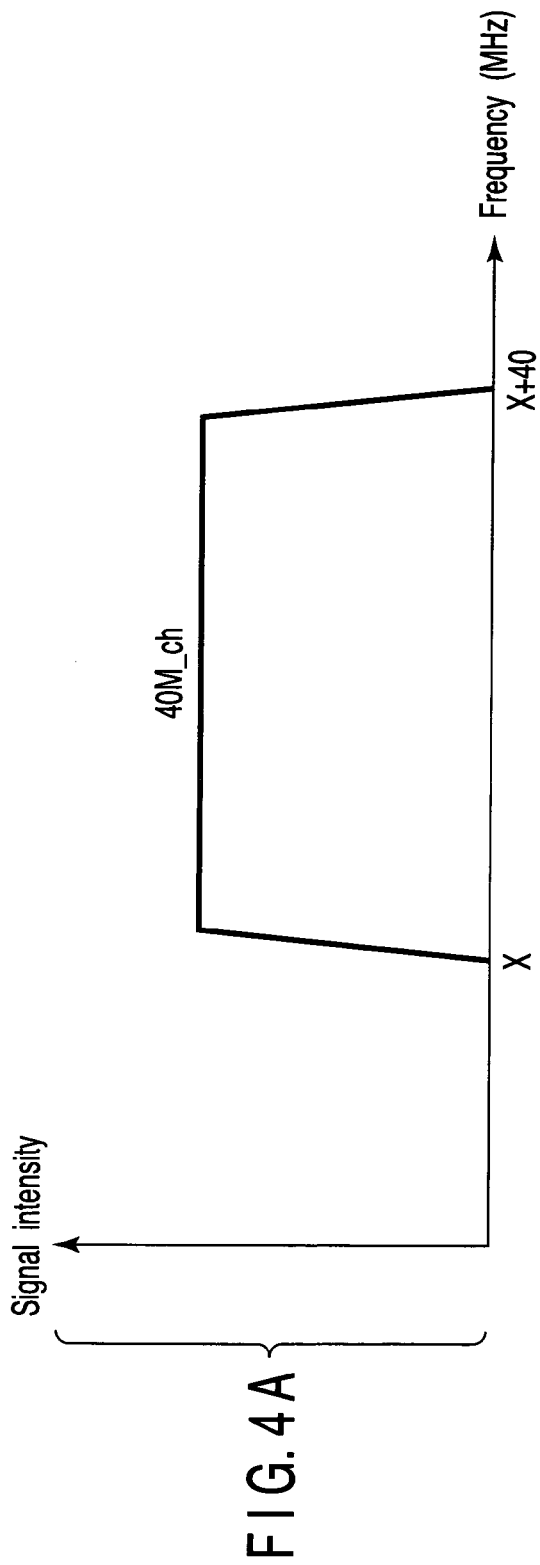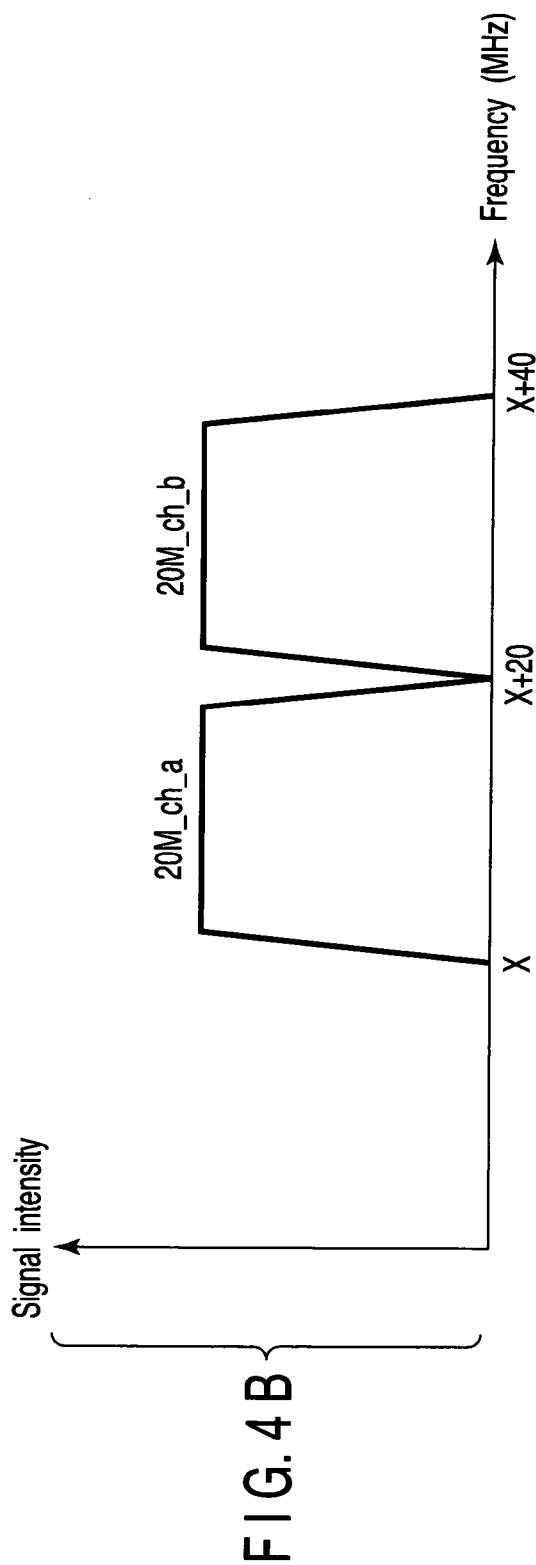
FIG. 4A
FIG. 4B

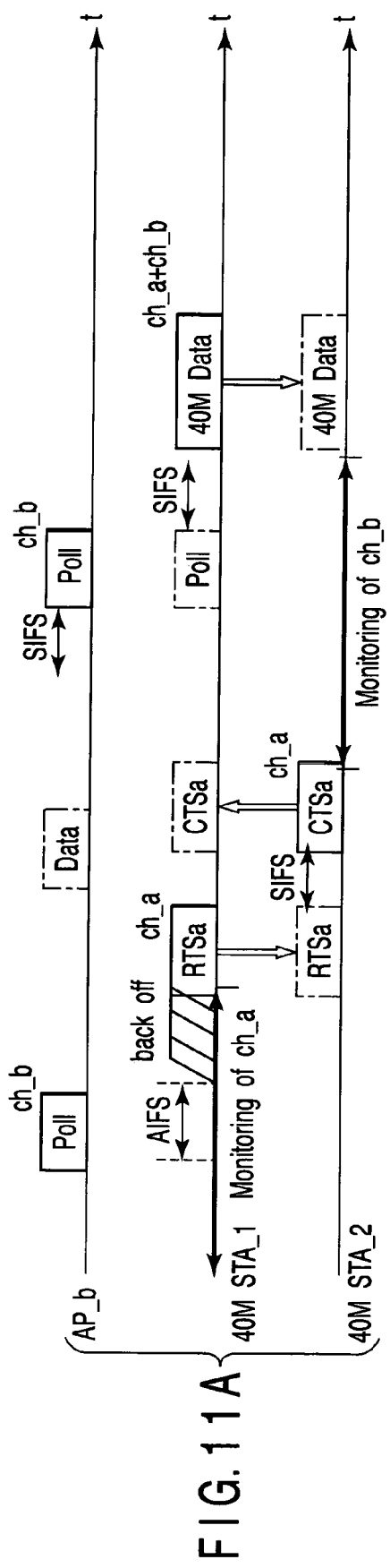
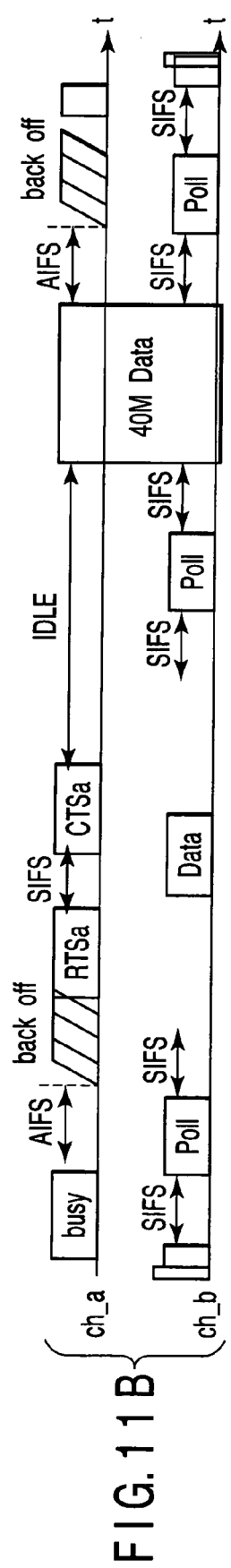
F I G. 11A    F I G. 11B

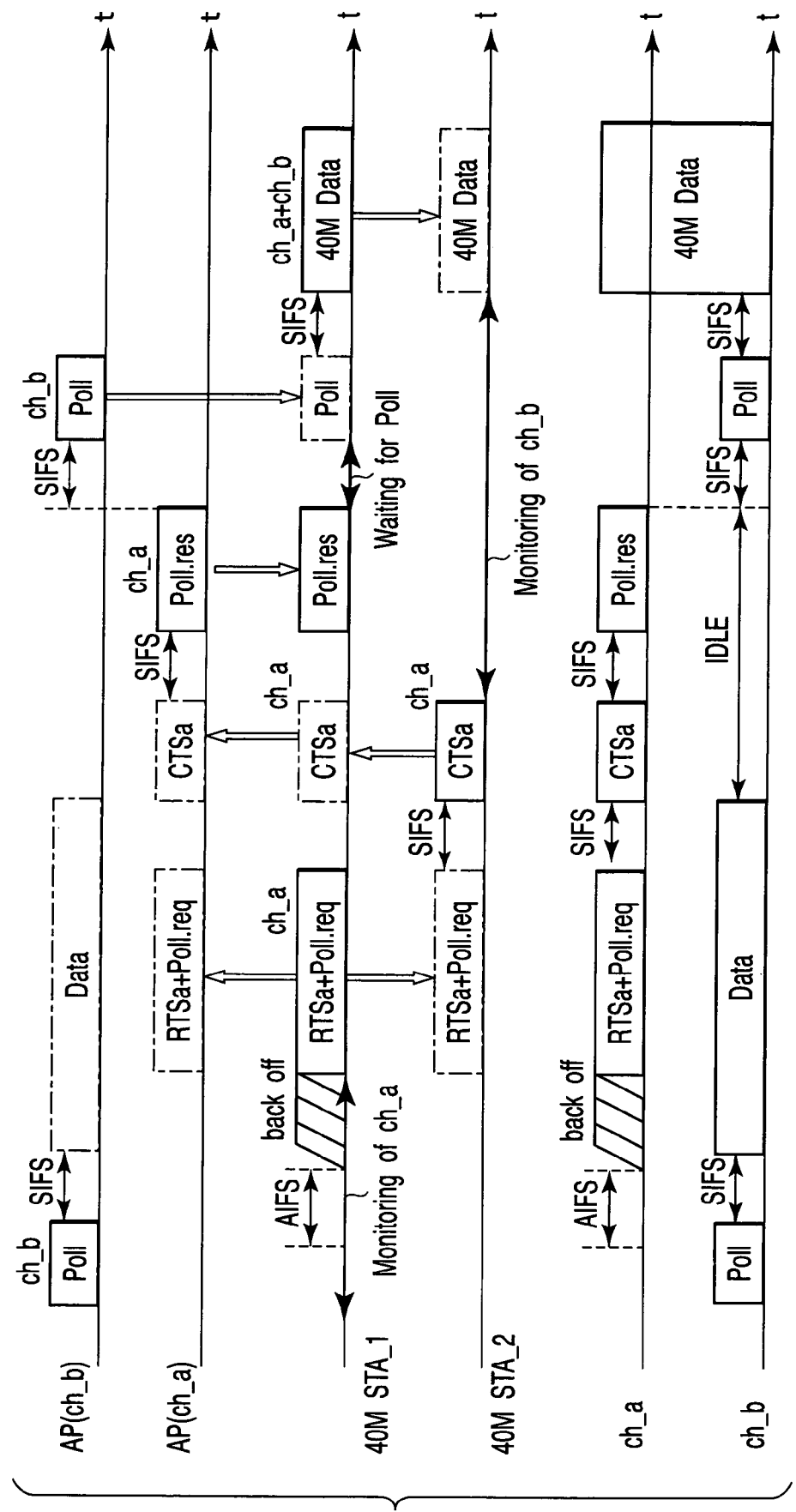
F I G. 13

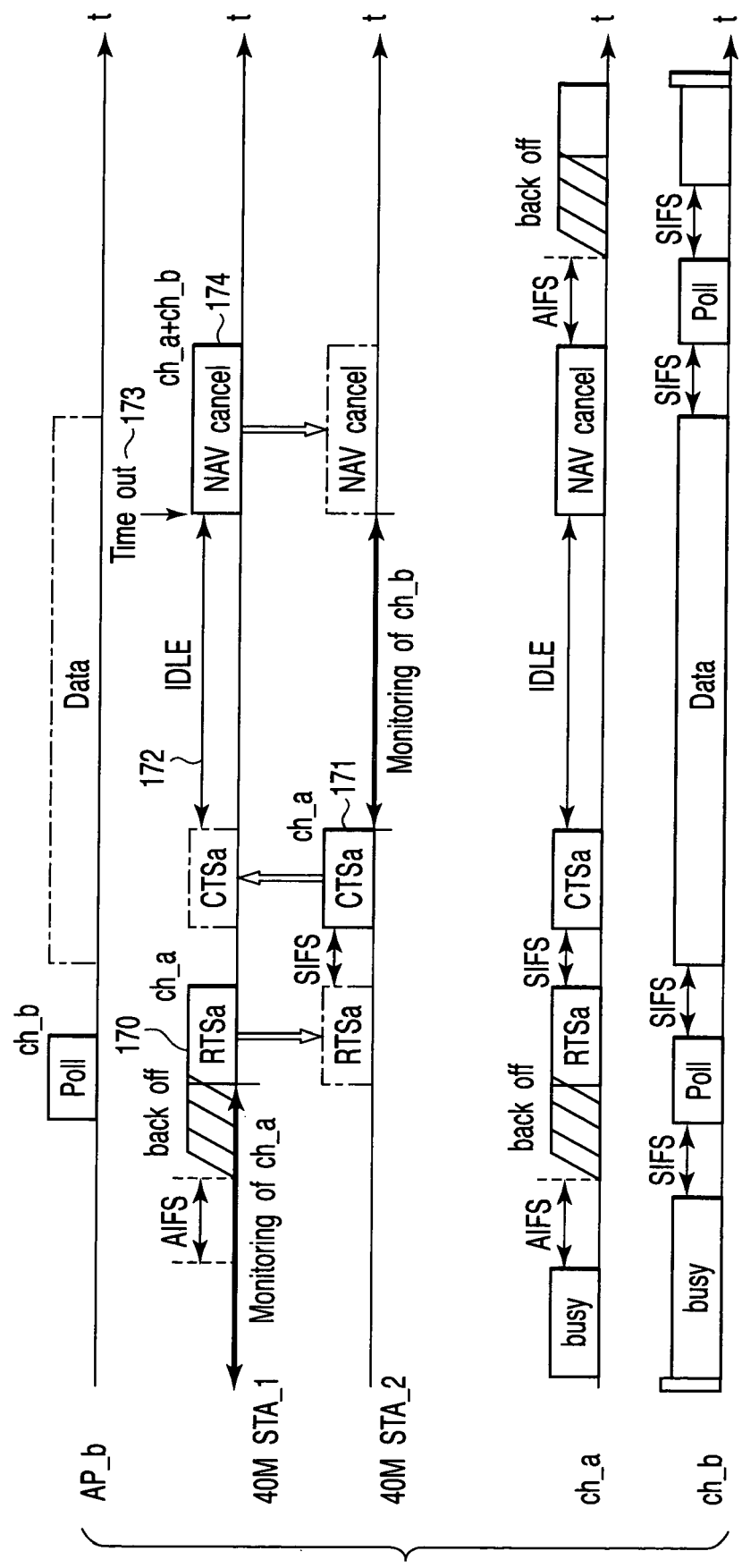
F I G. 17

WIRELESS COMMUNICATION METHOD AND APPARATUS

CROSS-REFERENCE TO RELATED APPLICATIONS

This application is based upon and claims the benefit of priority from prior Japanese Patent Applications No. 2004-063238, filed Mar. 5, 2004; No. 2004-160177, filed May 28, 2004; and No. 2004-242893, filed Aug. 23, 2004, the entire contents of all of which are incorporated herein by reference.

BACKGROUND OF THE INVENTION

1. Field of the Invention

The present invention relates to a wireless communication method and apparatus which perform media access control on the basis of carrier sense states.

2. Description of the Related Art

Media access control (MAC) is control for causing a plurality of communication apparatuses which perform communication while sharing the same medium to decide how to use the medium in transmitting communication data. Owing to media access control, even if two or more communication apparatuses transmit communication data by using the same medium at the same time, there is a lower possibility of a collision, in which a communication apparatus on the receiving side cannot separate communication data. Media access control also reduces the chance of a medium not being used by any communication apparatuses, despite the presence of communication apparatuses having transmission requests.

In wireless communication, since it is difficult for a communication apparatus to monitor transmission data while transmitting the data, media access control which is not premised on collision detection is required. IEEE 802.11, which is a typical technical standard for wireless local area networks (LANs), uses Carrier Sense Multiple Access with Collision Avoidance (CSMA/CA).

According to CSMA/CA in IEEE 802.11, in the header of a MAC frame, a period (called a duration) until the end of a sequence comprising one or more frame exchanges following the MAC frame is set. In the duration, a communication apparatus which is irrelevant to the sequence and has no transmission right waits for transmission upon determining a virtual occupied state of the medium. This prevents collision. On the other hand, a communication apparatus which has a transmission right in this sequence recognizes that the medium is not used except for a period during which the medium is actually occupied.

IEEE 802.11 defines that the state of a medium is determined on the basis of a combination of virtual carrier sense on the MAC layer as in the former case and physical carrier sense on the physical layer as in the latter case, and media access control is performed on the basis of the determination.

Jpn. Pat. Appln. KOKAI Publication No. 2003-87856 discloses a method of realizing wireless base stations which can be commonly used in a plurality of wireless LAN schemes in a wireless communication system in which a plurality of wireless LAN schemes with different physical layers are present. More specifically, a wireless base station is made to alternately generate the first notification signal on the first physical layer and the second notification signal on the second physical layer and transmit them to wireless terminals, and the first and second physical layers are switched in synchronism with the first and second notification signals. The wireless terminal corresponding to the first physical layer is allowed access only for a predetermined period of time after the transmission time of the first notification signal, whereas the wireless terminal corresponding to the second physical layer is allowed access only for a predetermined period of time after the transmission time of the second notification signal.

IEEE 802.11 using CSMA/CA has made attempts to increase the communication speed mainly by changing the physical layer technology. With regard to the 2.4 GHz band, there have been changes from IEEE 802.11 (established in 1997, communication speed=2 Mbps) to IEEE 802.11b (established in 1999, communication speed=11 Mbps), and further to IEEE 802.11g (established in 2003, communication speed=54 Mbps). With regard to the 5 GHz band, only IEEE 802.11a (established in 1999, communication speed=54 Mbps) exists as a standard specifications.

In order to develop standard specifications directed to further increase communication speeds in both the 2.4- and the 5-GHz bands, IEEE 802.11 TGn (Task Group n) has already been established. In developing new specifications, when the same frequency band as that in the existing specifications (IEEE 802.11b/g/a) is to be used, it is important to assure coexistence with communication apparatuses conforming to the existing specifications. In addition, it is more preferable to have backward compatibility. For this reason, it is basically preferable that a protocol on the MAC layer conforms to CSMA/CA matching the existing specifications.

As an approach to an increase in communication speed, a method of increasing the frequency band of a channel is available. If a new specification uses a frequency band which has not been used, no problems arise in terms of coexistence and backward compatibility. According to Jpn. Pat. Appln. KOKAI Publication No. 2003-87856, although different frequency bands are set for the first and second physical layers, no frequencies overlap in the respective frequency bands, like for example, 4.9 to 5.0 GHz and 5.03 to 5.09 GHz. However, since frequencies are valuable resources, new channels having new frequency bands are preferably assigned to frequency bands which have already been used. For example, making one new channel include a plurality of existing channels is effective in increasing the frequency use efficiency.

Therefore, in order to allow communication apparatuses conforming to new specifications to maintain coexistence and backward compatibility with communication apparatuses conforming to existing specifications, it is necessary to perform not only media access control for new channels, at the time of communication using the new channels, but also media access control for existing channels by a method which can be understood by communication apparatuses conforming to the existing specifications. Conventional CSMA/CA is, however, designed to perform access control for one channel, and hence cannot perform media access control for a plurality of channels which have different frequency bandwidths and in which frequencies overlap.

BRIEF SUMMARY OF THE INVENTION

The present invention is directed to provide a wireless communication method and apparatus which can perform media access control for a plurality of channels having different frequency bandwidths present in the same frequency spectrum.

According to a first aspect of the present invention, there is provided a wireless communication apparatus comprising a first physical layer protocol processing device configured to perform physical layer protocol processing for wireless communication using at least one first channel having a first frequency band, a second physical layer protocol processing device configured to perform physical layer protocol processing for wireless communication using a second channel having a second frequency band which is greater in bandwidth than the first frequency band and overlaps the first frequency band, a state management device configured to manage a carrier sense state of the first channel and determine whether or not the first channel satisfies a specific condition of determination of an idle state, and a first control device configured to perform control to generate a first frame which declares that the first channel will be occupied for a first predetermined period by virtual carrier sense, upon receiving a determination result, from the state management device, which indicates that the first channel satisfies the specific condition of determination of the idle state, and make the first physical layer protocol processing device transmit the first frame.

According to a second aspect of the present invention, there is provided a wireless communication apparatus comprising, in addition to the arrangement of the wireless communication apparatus according to the first aspect, a second control device configured to perform control to generate a second frame which declares that the second channel will be occupied for a second predetermined period by virtual carrier sense, and make the second physical layer protocol processing device transmit the second frame.

According to a third aspect of the present invention, there is provided a wireless communication apparatus comprising, in addition to the arrangement of the wireless communication apparatus according to the first aspect, a second control device configured to perform control to generate a second frame which releases the second channel by virtual carrier sense and make the second physical layer protocol processing device transmit the second frame.

According to a fourth aspect of the present invention, there is provided a wireless communication method comprising managing a carrier sense state of at least one first channel having a first frequency band, and determining whether or not the first channel satisfies a specific condition of determination of an idle state, and when the first channel satisfies the specific condition of determination of the idle state, generating a first frame which declares that the first channel will be occupied for a first predetermined period by virtual carrier sense, and transmitting the first frame through the first channel.

According to a fifth aspect of the present invention, there is provided a wireless communication method comprising managing a carrier sense state of at least one first channel having a first frequency band, and determining whether or not the first channel satisfies a specific condition of determination of an idle state, when the first channel satisfies the specific condition of determination of the idle state, generating a first frame which declares that the first channel will be occupied for a first predetermined period by virtual carrier sense, and transmitting the first frame through the first channel, and generating a second frame which declares that a second channel having a second frequency band which is greater in bandwidth than the first frequency band and overlaps the first frequency band will be occupied for a second predetermined period by virtual carrier sense, and transmitting the second frame through the second channel.

According to a sixth aspect of the present invention, there is provided a wireless communication method comprising managing a carrier sense state of at least one first channel having a first frequency band, and determining whether or not the first channel satisfies a specific condition of determination of an idle state, when the first channel satisfies the specific condition of determination of the idle state, generating a first frame which declares that the first channel will be occupied for a first predetermined period by virtual carrier sense, and transmitting the first frame through the first channel, and generating a second frame which releases, by virtual carrier sense, a second channel which is greater in bandwidth than the first frequency band and overlaps the first frequency band, and transmitting the second frame through the second channel.

According to a seventh aspect of the present invention, there is provided a wireless communication method comprising causing a transmitting terminal to monitor the execution/non-execution of frame transmission on a first channel having a first frequency band, when the first channel is in an idle state for a predetermined period, reserving the channel by exchanging transmission request/transmission request acknowledgement frames between the transmitting terminal and a destination terminal by using the first channel, causing the destination terminal which has received a transmission request frame through the first channel to monitor a second channel having a second frequency band which is greater in bandwidth than the first frequency band and overlaps the first frequency band, and when the second channel is in the idle state for a predetermined period, causing the destination terminal to transmit a transmission request acknowledgement frame by using the second channel.

According to an eighth aspect of the present invention, there is provided a wireless communication method comprising causing a transmitting terminal to monitor the execution/non-execution of frame transmission on a first channel having a first frequency band, when the first channel is in an idle state for a predetermined period, reserving the channel by exchanging transmission request/transmission request acknowledgement frames between the transmitting terminal and a destination terminal by using the first channel, and causing a control terminal which manages a second channel having a second frequency band which is greater in bandwidth than the first frequency band and overlaps the first frequency band to permit the transmitting terminal to use the second channel by transmitting a Poll frame by using the second channel.

BRIEF DESCRIPTION OF THE SEVERAL VIEWS OF THE DRAWING

FIG. 1 is a block diagram of the first wireless communication apparatus according to a first embodiment of the present invention;

FIGS. 4A and 4B are graphs for explaining the first channel in the first frequency band and the second channel in the second frequency band according to the first embodiment of the present invention;

FIGS. 11A and 11B are timing charts for explaining a physical mode and carrier sense state control in the second network arrangement;

FIG. 13 is a chart showing the operation of exchanging frames when 40M STA_1 transmits Poll request information to AP upon adding it to RTS;

FIG. 17 is a chart for explaining a case wherein transmission is abandoned because a turn to execute polling on 20M_ch_b is not provided within a timeout time.

DETAILED DESCRIPTION OF THE INVENTION

First Embodiment

Figure 2:
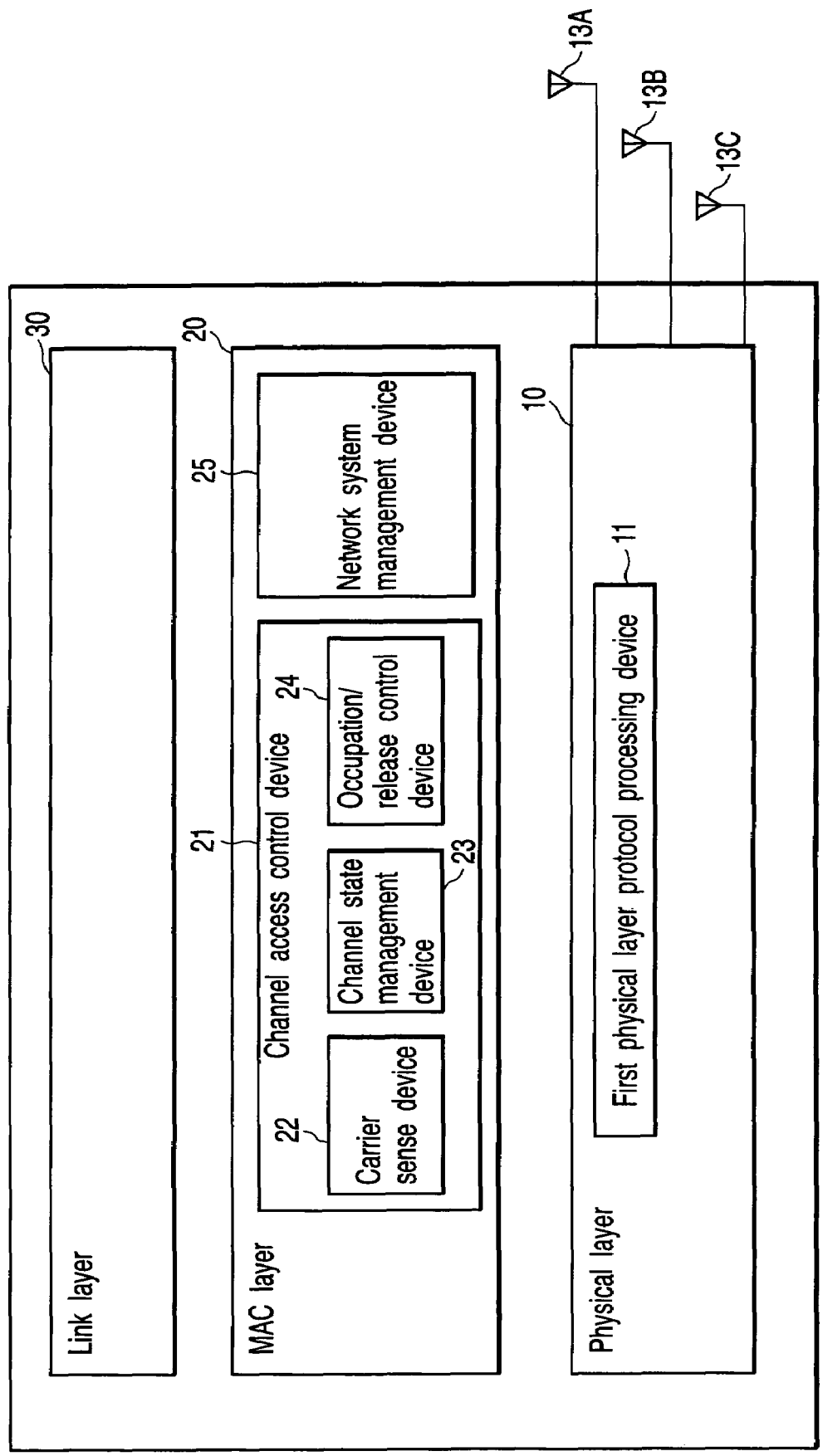
FIG. 2 is a block diagram of the second wireless communication apparatus according to the first embodiment of the present invention.

As shown in FIG. 1, a wireless communication apparatus according to a first embodiment is roughly comprised of a physical layer 10, MAC layer 20, and link layer 30. Referring to FIG. 1, the physical layer 10 corresponds to two types of physical layer protocols using channels having different frequency bands. More specifically, the physical layer 10 includes a first physical layer protocol processing device 11 which performs physical layer protocol processing for communication by using the first channel having the first frequency band, and a second physical layer protocol processing device 12 which performs physical layer protocol processing for communication by using the second channel having the second frequency band which is wider than the first frequency band and overlaps it. The first physical layer protocol processing device 11 and second physical layer protocol processing device 12 often share circuits and are not necessarily independent of each other in terms of implementation.

The protocols processed by the first physical layer protocol processing device 11 include, for example, at least a physical layer protocol defined by IEEE 802.11a. Assume that the first frequency band used by the first physical layer protocol processing device 11 has a bandwidth of, e.g., 20 MHz. The first physical layer protocol processing device 11 may use a so-called multiple-input multiple-output (MIMO) technique using a plurality antennas 13A to 13C on each of the transmitting side and the receiving side. Using the MIMO technique makes it possible to expect an increase in transmission capacity almost proportional to the number of antennas without changing the frequency band. It is therefore highly probable that this technique is adopted for IEEE 802.11 Task Group n (TGn) directed to a further increase in the throughput of IEEE 802.11.

Assume that the second physical layer protocol processing device 12 uses, for example, one or both of single-input single-output (SISO) and MIMO techniques. Assume that the second frequency band used by the second physical layer protocol processing device 12 has a bandwidth of, e.g., 40 MHz. The first frequency band exists in the second frequency band.

The MAC layer 20 includes a channel access control device 21. The channel access control device 21 includes a carrier sense device 22, channel state management device 23, and channel occupation/release control device 24. The MAC layer 20 further includes a network system management device 25. The network system management device 25 manages the generation of beacon frames, association, and the like, and is extended as needed, as will be described later.

The carrier sense device 22 manages the idle/busy states of channels by managing carrier sense states on the basis of a combination of the real carrier sense information obtained from the physical layer 10 and the virtual carrier sense information obtained from a protocol at the MAC layer 20. That is, the carrier sense device 22 manages the idle/busy states of one or more first channels in the first frequency band and one or more second channels in the second frequency band instead of managing the idle/busy state of a single channel.

The channel occupation/release control device 24 generates a frame for controlling the virtual carrier sense state of the MAC layer 20, which is required to occupy a channel for a predetermined period of time or release an occupied channel. The frame generated by the channel occupation/release control device 24 is sent to the physical layer 10 and is transmitted by the first physical layer protocol processing device 11 and second physical layer protocol processing device 12.

The channel state management device 23 makes the carrier sense device 22, the channel occupation/release control device 24, and the first and second physical layer protocol processing devices 11 and 12 of the physical layer 10 operate in concert to perform desired channel access control.

Practical examples of the wireless communication apparatus shown in FIG. 1 include, for example, a 40M/20M MIMO STA (AP) and a 40M/20M STA (AP). The 40M/20M MIMO STA (AP) is a terminal (or access point) which can perform SISO transmission/reception through a 20-MHz channel, MIMO transmission/reception through a 20-MHz channel, SISO transmission/reception through a 40-MHz channel, and MIMO transmission/reception through a 40-MHz channel. The 40M/20M STA (AP) is a terminal (or access point) which can perform SISO transmission/reception through a 20-MHz channel and SISO transmission/reception through a 40-MHz channel. Assume that the link layer 30 is provided with the function of a general link layer defined by IEEE 802.

Another wireless communication apparatus shown in FIG. 2 differs from the wireless communication apparatus shown in FIG. 1 in that the physical layer 10 does not include the second physical layer protocol processing device 12 shown in FIG. 1. This apparatus is the same as the wireless communication apparatus in FIG. 1 in that the first frequency band of the first physical layer protocol processing device 11 has a nominal bandwidth of 20-MHz and it makes no difference whether or not the MIMO technique is included. In addition, these apparatuses are the same in terms of the MAC layer 20 and link layer 30.

Note, however, that the wireless communication apparatus in FIG. 2 performs only media access control based on the first physical layer protocol processing device 11, and hence partly differs from the wireless communication apparatus shown in FIG. 1 in the details of the operation of the MAC layer 20 in FIG. 2. If the first physical layer protocol processing device 11 does not include the MIMO technique, the wireless communication apparatus in FIG. 2 may be an existing apparatus conforming to at least one of IEEE 802.11a, IEEE 802.11b, and IEEE 802.1g.

Practical examples of the wireless communication apparatus shown in FIG. 2 include, for example, a 20M MIMO STA (AP) and a 20M STA (AP). The 20M MIMO STA (AP) is a terminal (or access point) which can perform SISO transmission/reception through a 20-MHz channel and MIMO transmission/reception through a 20-MHz channel. The 20M STA (AP) is a terminal (access point) which can perform SISO transmission/reception through a 20-MHz channel.

Figure 3:
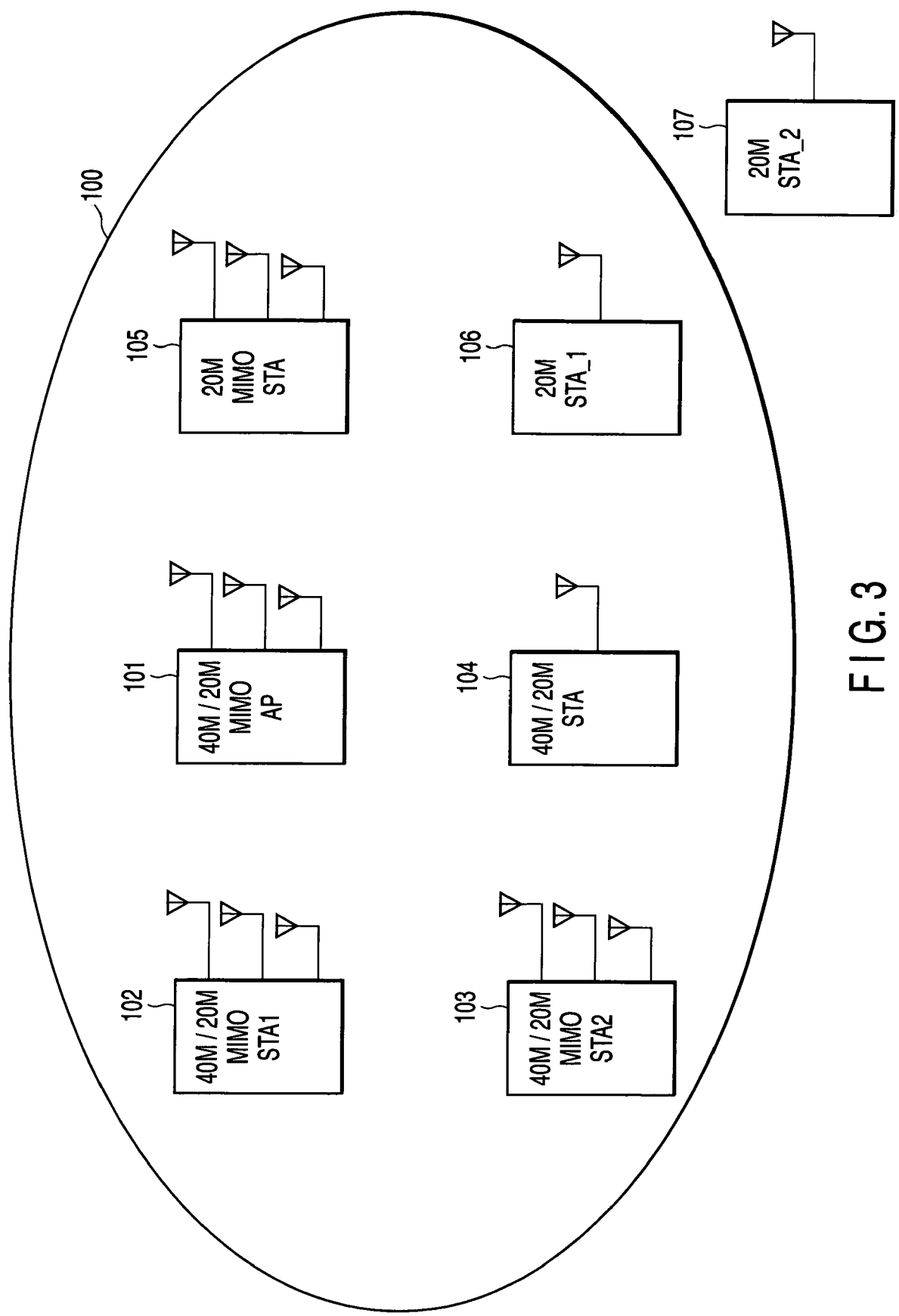
FIG. 3 is a view showing an example of a network including the wireless communication apparatuses according to the first embodiment of the present invention.

FIG. 3 shows an example of a network 100 including the wireless communication apparatuses in FIGS. 1 and 2. A base station 101 in the network 100 is an access point corresponding to a 40M/20M MIMO AP. Terminals 102 to 106 have established association with the base station 101. In this case, the terminal 102 is a 40M/20M MIMO STA__1; the terminal 103, a 40M/20M MIMO STA__2; the terminal 104, a 40M/20M STA; the terminal 105, a 20M MIMO STA; and the terminal 106, a 20M STA__1. Assume that another terminal 107 is a 20M STA__2 and belongs to a network using, for example, 20M_ch_b.

The network 100 in FIG. 3 has a 20-MHz channel 20M_ch_a using a frequency band from X MHz to (X+20) MHz and a 40-MHz channel 40M_ch using a frequency band from X MHz to (X+40) MHz. Therefore, the frequency band from X MHz to (X+20) MHz is redundantly used by the 20-MHz channel and 40-MHz channel. Another 20-MHz channel 20M_ch_b using the frequency band from (X+20) MHz to (X+40) MHz is not used in the network 100 in FIG. 3, but may be used in another network.

In the network 100, the 40-MHz channel 40M_ch and one of the 20-MHz channels 20M_ch_a and 20M_ch_b which overlap 40M_ch in terms of frequency are used. In other words, a 40M/20M MIMO STA and a 40M/20M STA belonging to the network 100 do not simultaneously use 20M_ch_a and 20M_ch_b.

Even if an attempt is made to simultaneously use 20M_ch_a and 20M_ch_b, as long as the IEEE 802.11 protocol is used, transmission through 20M_ch_a and reception through 20M_ch_b may simultaneously occur in the same apparatus. If, for example, a given terminal receives a data frame addressed thereto through 20M_ch_a, the terminal needs to transmit an ACK after a fixed short inter-frame space (SIFS) period. Since 20M_ch_a is subjected to media access control independently of 20M_ch_b, frame exchange may be simultaneously performed through 20M_ch_b. It is generally difficult to perform implementation so as to simultaneously perform transmission and reception within the same frequency band even through different channels. Therefore, the terminal which is transmitting an ACK cannot receive the frame exchanged through 20M_ch_b.

Connection control for the formation of the network 100 will be described next. In the 40M/20M MIMO AP which is the base station 101, the first physical layer protocol processing device 11 periodically broadcasts a beacon frame by using 20M_ch_a under the control of the network system management device 25. Each of the terminals 102 to 106 can receive the beacon frame by passively scanning 20M_ch_a, thereby recognizing the presence of the base station 101, i.e., the presence of the network 100.

Alternatively, each of the terminals 102 to 106 can recognize the presence of the base station 101, i.e., the presence of the network 100, by performing active scan, i.e., transmitting a probe request frame by itself using 20M_ch_a, and receiving a probe response frame from the corresponding base station 101.

The 40M/20M MIMO AP serving as the base station 101 basically operates through 20M_ch_a and 40M_ch, but temporarily performs transmission/reception through 20M_ch_b to switch to 40M_ch (to be described later). In this case, the 40M/20M MIMO AP ignores a probe request for 20M_ch_b and generates no probe response. Each of the terminals 102 to 106 selects the base station 101 (network 100) to connect to on the basis of information contained in the beacon frames or probe response frames obtained by scanning a plurality of channels, the reception signal strengths of the beacon frames or probe response frames, or the like. The beacon frame or probe response frame transmitted by the 40M/20M MIMO AP serving as the base station 101, in particular, contains information indicating that the base station 101 which transmits the frame is an access point corresponding to 40M/20M, information indicating the number of waves multiplexed according to the MIMO technique with which the base station 101 can cope (these pieces of information will be generically referred to as access point information hereinafter), and the like. Access point information is contained in one or both of a capability information field (CIF) and information element (IE). These pieces of access point information may sometimes be implicitly indicated by the value of a data rate which can be handled.

Each of the terminals 102 to 106 selects the base station 101 (network 100) by referring to such access point information. That is, for example, the terminals 102, 103, and 104 (40M/20M MIMO STA and 40M/20M STA) increase the priorities of base stations corresponding to the 40M channel, and the terminals 102, 103, 105, and 106 (40M/20M MIMO STA and 20M MIMO STA) increase the priorities of base stations corresponding to MIMO. Assume that the terminal 106 (20M STA) cannot understand information associated with the 40M channel and MIMO contained in a beacon frame or beacon response frame from the base station 101. Therefore, these pieces of information have no influence on the selection of a base station by the terminal 106 (20M STA).

Figure 5:
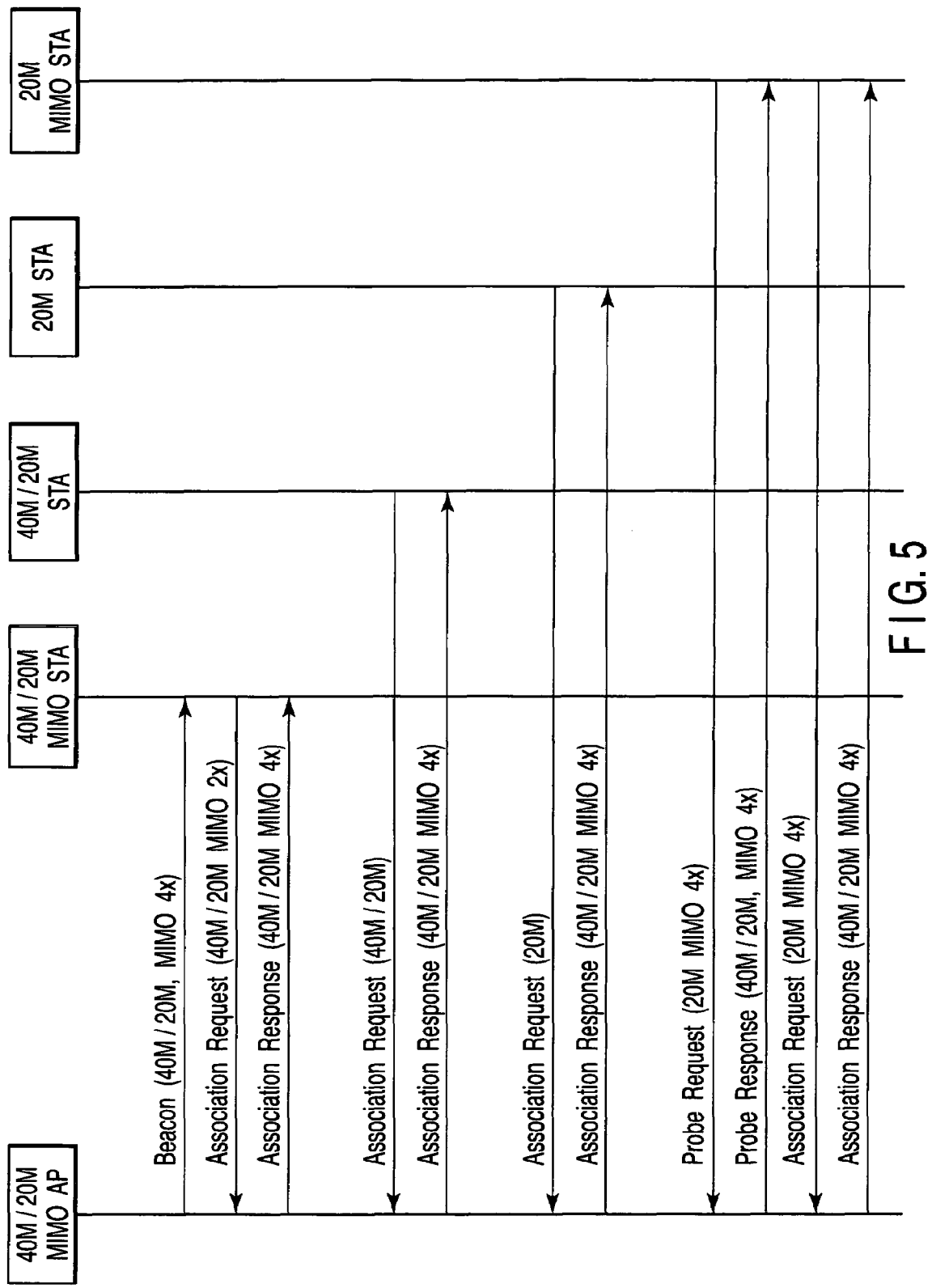
FIG. 5 is a chart showing an example of a connection sequence in the network in FIG. 3.

FIG. 5 shows an example of a connection sequence in the network 100 in FIG. 3. The connection sequence is performed by using the channel (20M_ch_a in this case) through which a beacon/probe response by which a terminal has found the network 100 has been received. In this case, authentication is to be performed before connection (association). However, an explanation of authentication will be omitted from FIG. 5 and the following description.

The 40M/20M MIMO AP serving as the base station 101 periodically broadcasts a beacon (40M/20M MIMO 4×) indicating that a 40-MHz channel, a 20-MHz channel, and four multiplexed MIMO channels are supported. Each of the terminals 102 to 106 (40M/20M MIMO STA, 40M/20M STA, and 20M STA) receives the broadcast beacon (40M/20M MIMO 4×), and selects to connect to the network 100.

The terminals 102 to 106 (40M/20M MIMO STA, 40M/20M STA, and 20M STA) transmit an association request (40M/20M MIMO 2×), association request (40M/20M), and association request (20M), which are connection requests containing information indicating the ability (data rate that can be handled) of each terminal, to the base station 101 (40M/20M MIMO AP). The association request (40M/20M MIMO 2×) indicates that a 40-MHz channel, a 20-MHz channel, and two multiplexed MIMO channels are supported. The association request (40M/20M) indicates that a 40-MHz channel and 20-MHz channel are supported. The association request (20M) indicates that a 20-MHz channel is supported.

Upon receiving the association request (40M/20M MIMO 2×), association request (40M/20M), and association request (20M), which are connection requests, the base station 101 (40M/20M MIMO AP) stores the schemes and data rates supported by the terminals 102 to 106. The stored information is used to, for example, guarantee that when transmitting frames to the terminals 102 to 106, the base station 101 transmits the frames within the ranges of schemes and data rates which are supported by the respective terminals at the destinations.

The operation mode of the physical layer (which will be referred to as a PHY mode) and carrier sense state control in the network 100 in FIG. 3 will be described next with reference to FIGS. 6A to 6E. In the example shown in FIGS. 6A to 6E, a 40M/20M MIMO AP serving as the base station 101 controls switching between a period (20M_ch_a period) during which communication is performed by using 20M_ch_a and a period (40M_ch period) during which communication is performed by using 40M_ch. In a 20M_ch_a period and 40M_ch period, it does not matter whether a mode (PCF or HCCA) in which the base station 101 performs media access control by polling the terminals 102 to 106 or a mode (DCF or EDCA) in which the terminals 102 to 106 perform media access control on a contention basis with each other.

FIGS. 6A to 6E show a state wherein communication is performed by using 20M_ch_a at first in the network 100, and the 20M_ch_a period is restored after a 40M_ch period. In the network 100, 20M_ch_a and 40M_ch are used for communication. In order to use 40M_ch, however, the use of 20M_ch_b using frequencies overlapping those in 40M_ch has to be inhibited. 20M_ch_b may be used in another network adjacent to the network 100 or may not be used at all.

Figure 6:
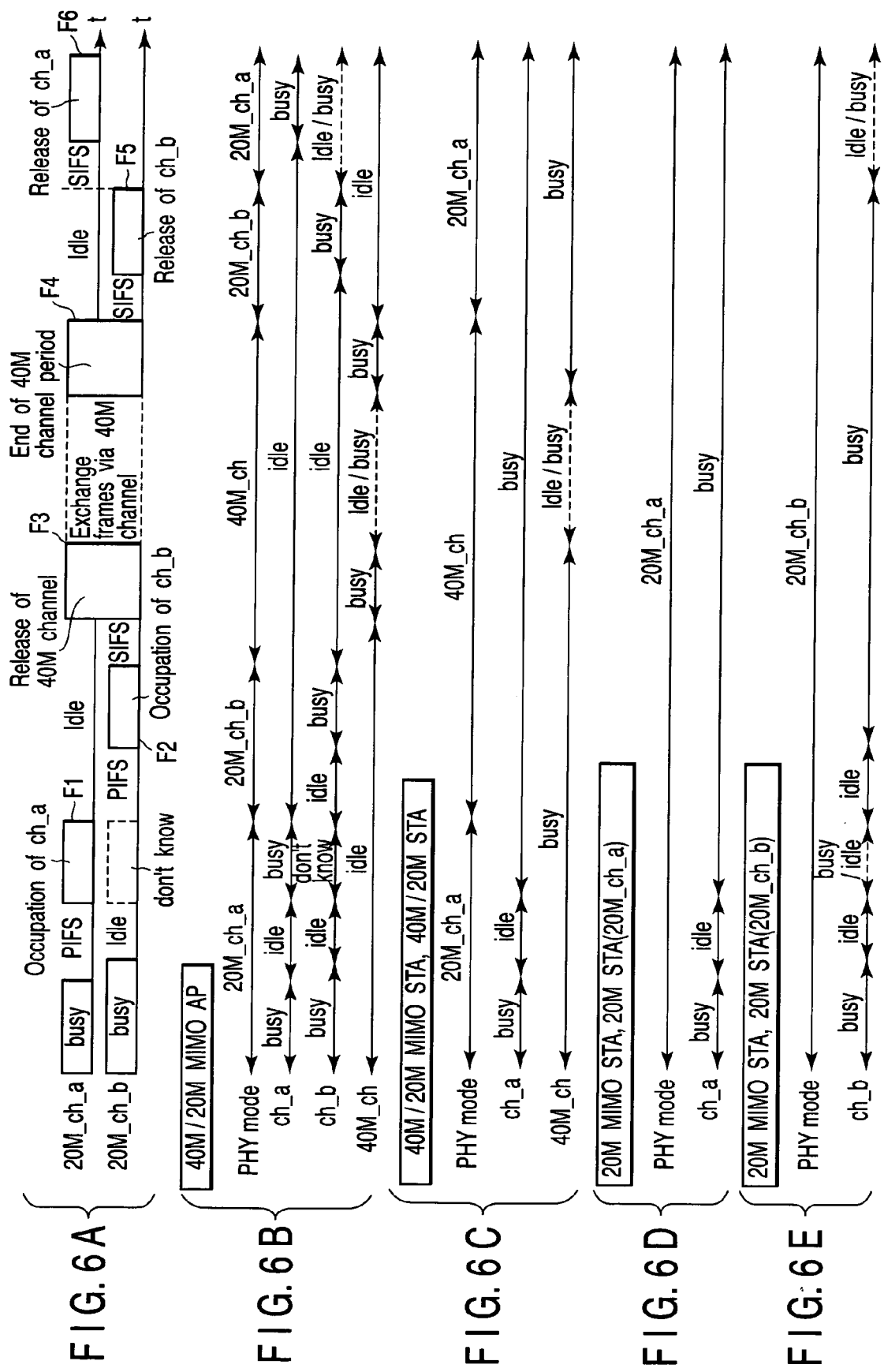
FIGS. 6A to 6E are timing charts for explaining the operation mode of a physical layer and carrier sense state control in the network in FIG. 3.

FIG. 6A shows an outline of the operation of exchanging main frames required for control. FIG. 6B shows the PHY mode of the 40M/20M MIMO AP and the carrier sense state of each channel (20M_ch_a, 20M_ch_b, and 40M_ch). FIG. 6C shows the PHY mode of the 40M/20M MIMO STA or 40M/20M STA and the carrier sense state of each channel (20M_ch_a and 40M_ch). FIG. 6D shows the PHY mode of the 20M MIMO STA or 20M STA and the carrier sense state of the channel 20M_ch_a. The 20M MIMO STA or 20M STA using 20M_ch_a may be terminals belonging to the network 100. FIG. 6E shows the PHY mode of the 20M MIMO STA or 20M STA using 20M_ch_b (terminals which do not belong to the network 100 but belong to an adjacent network) and the carrier sense state of 20M_ch_b.

FIGS. 6A to 6E express the carrier sense states with no distinction between the MAC layers and the physical layers. In a terminal-or base station which performs PHY mode switching, a carrier sense state may be unclear. If, for example, a given terminal is operating in a specific PHY mode (or may be expressed as a channel) A (e.g., 20M_ch_a), the real carrier sense state of the physical layer of another PHY mode B (e.g., 20M_ch_b or 40M_ch) is unclear. In addition, assume that when the busy state of the virtual carrier sense of the MAC layer in the specific PHY mode A (e.g., 20M_ch_a) (or if the self-apparatus holds a media access right, the valid duration of the right) is terminated, the apparatus switches to another PHY mode B (e.g., 20M_ch_b or 40M_ch), the virtual carrier sense state of the MAC layer in the PHY mode A set first is unclear. If the PHY mode is switched, the carrier sense state of the PHY mode in the PHY mode may become unclear at an early stage after switching.

As a carrier sense state, an idle/busy state which coincides with the operation mode and channel of the currently used physical layer is selected from the idle/busy states of the operation modes and channels of a plurality of physical layers managed by the carrier sense device 22. That is, each wireless communication apparatus basically performs media access control in accordance with a carrier sense state associated with the operation mode and channel of the physical layer 10 of the self-apparatus. When, for example, a given apparatus is operating through 40M_ch, the apparatus performs media access control in accordance with the carrier sense state of 40M_ch. When the apparatus is operating through 20M_ch_a, it performs media access control in accordance with the carrier sense state of 20M_ch_a. Even if, therefore, a carrier sense state becomes unclear, no problems arise in many cases.

An operation sequence will be described below with reference to FIGS. 6A to 6E. At first, the 40M/20M MIMO AP, 40M/20M MIMO STA, 40M/20M STA, 20M MIMO STA (20M_ch_a), and 20M STA (20M_ch_a) operate through 20M_ch_a, as shown in FIGS. 6B, 6C, and 6D. The 20M MIMO STA (20M_ch_b) and 20M STA (20M_ch_b) operate through 20M_ch_b, as shown in FIG. 6E.

Assume that in this state, the channel state management device 23 decides that the base station 101 (40M/20M MIMO AP) starts a sequence of switching to 40M_ch. In this case, 40M/20M MIMO AP manages the carrier sense state of 20M_ch_a shown in FIG. 6B by using the carrier sense device 22. When 20_ch_a is set in an idle state and the idle state continues for a PCF inter-frame space (PIFS) period, the carrier sense device 22 determines that the condition of the determination of the idle state of 20M_ch_a is satisfied. Upon receiving the determination result from the carrier sense device 22, which indicates that the condition of the determination of the idle state of 20M_ch_a is satisfied, the channel occupation/release control device 24 generates a frame (to be referred to as a Ch_a occupation declaration frame hereinafter) F1 which declares that 20M_ch_a will be occupied for the first predetermined period, and transmits it through 20M_ch_a by using the first physical layer protocol processing device 11.

The Ch_a occupation declaration frame F1 also informs that the operation mode of the network 100 is switched from 20M_ch_a to 40M_ch. If the base station 101 or the terminals 102 to 106 can set 40M ch and 20M ch in the reception wait state at the same time, there is no need to switch the operation mode. It therefore suffices if the Ch_a occupation declaration frame F1 declares only that 20_ch_a will be occupied for the first period. PIFS is used by 40M/20M MIMO AP to acquire a medium preferentially over other terminals. If different control policies are employed, a time interval other than PIFS, for example, a distributed inter-frame space (DIFS) period+ back off period may be used. The back off period is decided by a pseudo-random number to be a value between the maximum and minimum values.

The occupation period of 20M_ch_a is set to cover at least a scheduled 40M_ch period. In order to designate the occupied state of 20M_ch_a by a scheme comprehensible to 20M STA, a duration field is used for the header of the Ch_a occupation declaration frame F1. Assume that the destination of the Ch_a occupation declaration frame F1 is 40M/20M MIMO AP. The channel occupation/release control device 24 generates the Ch_a occupation declaration frame F1 under the control of the channel state management device 23. The Ch_a occupation declaration frame F1 is transmitted by the first physical layer protocol processing device 11 in the physical layer 10.

The Ch_a occupation declaration frame F1 may contain information indicating that 40M_ch will be occupied for a predetermined period of time. Since information indicating that 40M_ch will be occupied for a predetermined period of time need not have any backward compatibility, a duration field is not necessarily used, and the information may be added as new information. Alternatively, both 20M_ch_a and 40M_ch may be occupied for the same period of time according to the value of a duration field.

Upon receiving the Ch_a occupation declaration frame F1, 40M/20M MIMO STA and 40M/20M STA set the carrier sense state of the MAC layer of 20M_ch_a in the busy state for a designated period of time, and at the same time, switch the PHY mode from 20M_ch_a to 40M_ch, as shown in FIG. 6C. Although FIG. 6C shows a case wherein the carrier sense state of the MAC layer of 40M_ch is set in the busy state in advance, the carrier sense state may be set in the busy state in accordance with the received Ch_a occupation declaration frame F1.

Although the operation mode of the network 100 is switched to 40M_ch in this manner, since the carrier sense state of the MAC layer is in the busy state, 40M/20M MIMO STA and 40M/20M STA cannot transmit a frame. That is, the channel occupation/release control device 24 analyzes the Ch_a occupation declaration frame F1, and the carrier sense device 22 changes the carrier sense state on the basis of the analysis result. The channel state management device 23 then instructs-the physical layer 10 to perform PHY mode switching. As a consequence, this state is realized.

Upon receiving the Ch_a occupation declaration frame F1, 20M MIMO STA (20M_ch_a) and 20M STA (20M_ch_a) set the carrier sense state of the MAC layer of 20M_ch_a in the busy state for a designated period of time, as shown in FIG. 6D. Since the Ch_a occupation declaration frame F1 is transmitted through 20M_ch_a, 20M MIMO STA (20M_ch_b) and 20M STA (20M_ch_b) do not receive it.

The base station 101 (40M/20M MIMO AP) switches the PHY mode to 20M_ch_b, as shown in FIG. 6B. After this switching operation, 40M/20M MIMO AP transmits a frame (to be referred to as a Ch_b occupation declaration frame) F2 which declares that 20M_ch_b will be occupied for a predetermined period of time, after the idle state continues for a PIFS period. The Ch_b occupation declaration frame F2 may also inform that the operation mode of a terminal belonging to a network (not shown) other than the network 100 which shares the same physical medium as that of the network 100 from 20M_ch_b to 40M_ch. As in the case of the Ch_a occupation declaration frame F1, PIFS is used by 40M/20M MIMO AP to acquire a medium preferentially over other terminals. In addition, if different control policies are employed, a time interval other than PIFS, for example, a DIFS period+back off period may be used as in the case of the Ch_a occupation declaration frame F1.

The carrier sense state of 20M_ch_b immediately before the PHY mode is switched to 20M_ch_b is unclear. In general, the carrier sense of the physical layer 10 is high in sensitivity in the preamble portion at the head of a frame, and is low in sensitivity at some midpoint in the frame; It may therefore be dangerous to determine that 20M_ch_b is idle in a PIFS period. For this reason, a carrier sense state is preferably checked upon completion of the reception of the first frame preceding the Ch_b occupation declaration frame F2 through 20M_ch_b. Note, however, that since 20M_ch_b is not used in the network 100 managed by the base station 101, it is highly probable that 20M_ch_b is not actually used. In this case, therefore, a PIFS period is used in consideration of efficiency.

Upon receiving the Ch_b occupation declaration frame F2, 20M MIMO STA (20M_ch_b) and 20M STA (20M_ch_b) set the carrier sense state of the MAC layer of 20M_ch_b in the busy state for a designated period of time, as shown in FIG. 6C. Since the Ch_b occupation declaration frame F2 is transmitted through 20M_ch_b, neither 40M/20M MIMO STA and 40M/20M STA which have been switched to 40M_ch nor 20M MIMO STA (20M_ch_a) and 20M STA (20M_ch_a) which are operating through 20M_ch_a receive the Ch_b occupation declaration frame.

40M/20M MIMO AP then switches the PHY mode to 40M_ch, as shown in FIG. 6B. After this switching operation, 40M/20M MIMO AP transmits a frame (to be referred to as a 40M_ch release frame hereinafter) F3 for releasing 40M_ch, which has been occupied, after the duration of the idle state for an SIFS period. Since 40M/20M MIMO AP is ensuring a 40M_ch medium, the duration of the idle state for the SIFS period need not always be checked, but may be checked.

Upon receiving the 40M_ch release frame F3, 40M/20M MIMO AP and 40M/20M STA set the carrier sense state of the MAC layer of 40M_ch in the idle state for a designated period of time, as shown in FIG. 6C. Note that if the end of the idle period is to be informed separately, a period need not always be set in advance. At this point of time, in all 40M/20M MIMO AP, 40M/20M MIMO STA, and 40M/20M STA which operate through 40M_ch, the carrier sense state of MAC is set in the idle state. Subsequently, a medium is ensured by general media access, and 40M_ch frames are exchanged, as shown in FIG. 6A.

Since the 40M_ch release frame F3 is transmitted through 40M_ch, 20M MIMO STA (20M_ch_a), 20M STA (20M_ch_a), 20M MIMO STA (20M_ch_b), and 20M STA (20M_ch_b) do not receive the 40M_ch release frame F3. At this point of time, since the carrier sense state of the MAC layer of 20M_ch_a of 20M MIMO STA (20M_ch_a) and 20M STA (20M_ch_a) is in the busy state, and the carrier sense state of 20M_ch_b of 20M MIMO STA (20M_ch_b) and 20M STA (20M_ch_b) is in the busy state, 20M MIMO STA (20M_ch_a), 20M STA (20M_ch_a), 20M MIMO STA (20M_ch_b), and 20M STA (20M_ch_b) do not transmit any 20M_ch_a or 20M_ch_b frames which interfere with 40M_ch.

A sequence of switching from the mode of performing communication by using a 40-MHz channel (40M_ch) to the mode of performing communication by using a 20-MHz channel (20M_ch) in the network 100 will be described next with reference to FIGS. 6A to 6E. A period during which communication is performed by using 40M_ch and a period during which communication is performed by using 20M_ch will be referred to as a 40M_ch period and 20M_ch period, respectively.

A 40M_ch period may be naturally terminated at the end of the occupation period in the 40M_ch period. Alternatively, as shown in FIG. 6A, 40M/20M MIMO AP may transmit a frame (to be referred to as a 40M_ch period end frame) F4 which explicitly notifies the end of a 40M_ch period. The 40M_ch period end frame F4 explicitly or implicitly issues an instruction to start a new occupation period of 40M_ch and switch to 20M_ch_a.

When a 40M_ch naturally ends or the 40M_ch period end frame F4 is received, 40M/20M MIMO STA and 40M/20M STA set the carrier sense state of MAC of 40M_ch in the busy state, as shown in FIG. 6C, and switch PHY mode to 20M_ch_a. The carrier sense state of MAC of 20M_ch_a is kept in the busy state, and 40M/20M MIMO STA and 40M/20M STA cannot transmit a 20M_ch_a frame yet.

Since the 40M_ch period end frame F4 is transmitted through 40M_ch, 20M MIMO STA (20M_ch_a), 20M STA (20M_ch_a), 20M MIMO STA (20M_ch_b), and 20M STA (20M_ch_b) do not receive any 40M_ch end frames, as shown in FIGS. 6D and 6E. In addition, since 20M MIMO STA (20M_ch_a), 20M STA (20M_ch_a), 20M MIMO STA (20M_ch_b), and 20M STA (20M_ch_b) do not have any states associated with 40M_ch, even when 40M_ch naturally ends, no specific change occur.

Subsequently, 40M/20M MIMO AP switches the PHY mode to 20M_ch_b, as shown in FIG. 6B, and transmits a frame (to be referred to as a Ch_b release frame hereinafter) F5 for releasing the occupied state of 20M_ch_b, as shown in FIG. 6A. The occupation period of 20M_ch_b may be made to naturally end by making setting, in advance, to end the occupation period of 20M_ch_b following the end of a 40M_ch period.

Upon receiving the Ch_b release frame F5 or the occupation period of 20M_ch_b naturally ends, 20M MIMO STA (20M_ch_b) and 20M STA (20M_ch_b) set the carrier sense state of the MAC layer of 20M_ch_b in the idle state, as shown in FIG. 6D. With this operation, 20M MIMO STA (20M_ch_b) and 20M STA (20M_ch_b) can start exchanging 20M_ch_b frames.

Since the Ch_b release frame F5 is transmitted through 20M_ch_b, neither 40M/20M MIMO STA and 40M/20M STA which have been switched to 20M_ch_a nor 40M/20M MIMO STA (20M_ch_a) and 20M MIMO STA (20M_ch_a) which are operating through 20M_ch_a receive the Ch_b release frame F5. In addition, since 40M/20M MIMO STA, 40M/20M STA, 20M MIMO STA (20M_ch_a), and 20M STA (20M_ch_a) do not have any states associated with 20M_ch_b, even if the occupation period of 20M_ch_b naturally ends, no specific change occurs.

Subsequently, 40M/20M MIMO AP switches the PHY mode to 20M_ch_a, as shown in FIG. 6B, and transmits a frame (to be referred to as a Ch_a release frame hereinafter) F6 for releasing the occupied state of 20M_ch_a, as shown in FIG. 6A. The occupation period of 20M_ch_a may be made to naturally end by making setting, in advance, to end the occupation period of 20M_ch_a following the end of a 40M_ch period and the occupation period of 20M_ch_a.

Upon receiving the Ch_a release frame F6 or the occupation period of 20M_ch_a naturally ends, 40M/20M MIMO STA and 40M/20M STA which have been switched to 20M_ch_a and 20M MIMO STA (20M_ch_a) and 20M STA (20M_ch_a) which are operating through 20M_ch_a set the carrier sense state of the MAC layer of 20M_ch_a in the idle state. With this operation, 40M/20M MIMO STA, 40M/20M STA, 20M MIMO STA (20M_ch_a), and 20M STA (20M_ch_a) can start exchanging 20M_ch_a frames.

Since the Ch_a release frame F6 is transmitted through 20M_ch_a, 20M MIMO STA (20M_ch_b) and 20M STA (20M_ch_b) which are operating through 20M_ch_b do not receive the Ch_a release frame F6. In addition, since 20M MIMO STA (20M_ch_b) and 20M STA (20M_ch_b) do not have any states associated with 20M_ch_a, even if the occupation period of 20M_ch_a naturally ends, no specific change occurs.

Note that even a terminal which can perform transmission/reception only through 40M_ch can be made to coexist by basically the same sequence as that described above.

According to the above sequence, a 40M_ch period is started when 40M/20M MIMO AP transmits the 40M_ch release frame F3. This is a sequence for allowing the respective apparatuses to acquire media on an contention basis in a 40M_ch period on the basis of Distributed Coordination Function (DCF) or EDCA (HCF Contention Access). However, it is necessary to provide a scheme in which 40M/20M MIMO AP serving as a base station in the network assigns media access rights to the respective terminals basically by the polling scheme on the basis of Point Coordination Function (PCF), HCF Controlled Access (HCCA), or the like. In this case, when starting a 40M_ch period, 40M/20M MIMO AP may transmit a frame explicitly indicating a period during which media access rights are assigned by the polling scheme instead of the 40M_ch release frame F3. This frame contains information in the form of destination addresses or the like which explicitly indicates distant terminals to which media access rights are to be assigned by polling.

In the operation example shown in FIGS. 6A to 6E, 20M_ch_a used in the network 100 is set in the busy state before 20M_ch_b, and is released after 20M_ch_b. A carrier sense state becomes unclear in 40M/20M MIMO AP in 20M_ch_b which is not used in the network 100. In contrast, such a state does not occur in 20M_ch_a used in the network. For this reason, if importance is attached to the reliability of a carrier sense state, this sequence seems preferable. Even if, however, the relativeسequence of occurrence of occupation and release of 20M_ch_a and 20M_ch_b is changed, the essence of this operation does not change.

If, for example, 20M_ch_b is occupied before 20M_ch_a and is released after 20M_ch_a, instructions for the occupation of 20M_ch_a and the release of 40M_ch can be integrated into one frame. In addition, instructions for the end of a 40M_ch period (the occupation of 40M_ch) and the release of 20M_ch_a can be integrated into one frame.

In the operation example shown in FIGS. 6A to 6E, it is assumed that while the physical layer 10 is operating through 40M_ch, each of 40M/20M MIMO AP, 40M/20M MIMO STA, and 40M/20M STA cannot transmit/receive any 20M_ch_a frames, and that while the physical layer 10 is operating through 20M_ch_a, each of 40M/20M MIMO AP, 40M/20M MIMO STA, and 40M/20M STA cannot transmit/receive any 40M_ch frames.

If 40M/20M MIMO AP, 40M/20M MIMO STA, and 40M/20M STA can transmit/receive 20M_ch_a frames and 40M_ch frames without switching operation modes (if they can receive any frames without deciding 20M_ch_a or 40M_ch in advance, in particular), the above sequence can be further simplified. That is, it suffices if 20M_ch_a and 40M_ch frames are exchanged without discriminating them while 40M/20M MIMO AP declares that only 20M_ch_b is occupied.

In the operation example shown in FIGS. 6A to 6E, when 40M/20M MIMO AP tries to acquire 20M_ch_b, 40M/20M MIMO AP may not find any chance to transmit the Ch_b occupation declaration frame F2 because 20M_ch_b is kept in the busy state for a predetermined period of time or more. In such a case, 40M/20M MIMO AP may abandon to start a 40M_ch period and transmit a Ch_a release frame so as to resume the 20M_ch period. If 40M/20M MIMO STA and 40M/20M STA can perform reception through 20M_ch_a even in the PHY mode, since they can notify, with a Ch_a release frame, that a 40M_ch period is not started, they can control the PHY mode as well. In addition, 40M/20M MIMO AP and 40M/20M STA may share a timeout value in overall BSS (by, for example, sharing information contained in beacons or information to be exchanged at the time of association) to return the PHY mode to 20M_ch_a if no 40M_ch release frame is received for a predetermined period of time. In any case, it suffices if Ch_a of each STA is set in the idle state, and the PHY mode is returned to 20M_ch_a. Other than this method, there can be a plurality of implementation methods based on combinations of control frames and timeouts.

Although not shown, providing a PLCP header portion common to a 20M channel frame for the head of a 40M channel frame makes it possible for 20M STA and 20M MIMO STA to receive and interpret the Rate and Length fields contained in the PHY header of the 40M channel frame transmitted in the 40M PHY mode. 20M STA and 20M MIMO STA interpret that a PHY medium is occupied for the time calculated by dividing Length by Rate. With this arrangement, F2 for occupying ch_b and F3 for releasing 40M channel can be integrated into one 40M channel frame. That is, Rate and Length contained in a PLCP header common to a 20M channel frame are set so as to cover at least part of the period during which 20M ch_b is occupied and make the period properly longer than the time which the frame itself to be transmitted occupies. With this operation, 20M STA and 20M MIMO STA existing in 20M ch_b determine that the period calculated from Data and Length is busy.

Rate and Length contained in a PLCP header common to a 20M channel frame need not coincide with the real transmission rate and data length of the corresponding frame. This is because 40M/20M MIMO STA and 40M/20M STA may be informed of the real transmission rate and data length by a method which can be understood by only apparatuses capable of receiving 40M channel frames (Note that if 20M STA is a conventional apparatus and 20M MIMO STA is an apparatus conforming to new specifications, a 40M PHY frame can be designed to also allow 20M MIMO STA to interpret it). 40M/20M STA and 40M/20M MIMO STA can interpret a portion following the PLCP header portion common to a 20M channel frame. By using this portion, the real transmission rate (40M Rate) and data length (40M Length) and 40M/20M STA and 40M/20M MIMO STA are informed of information indicating that 40M channel is released. Although 40M Rate and 40M Length are contained in the PHY header, the information indicating that 40M channel is released may be part of the information of the PHY header or contained in the MAC header.

If 20M STA is based on the IEEE 802.11a or IEEE 802.11g specifications, the maximum period (5.46 msec) can be set by setting Length to 4,095 octets and Rate to 6 Mbps. Although this period does not necessarily cover a 40M channel frame exchange period, if a 40M PHY frame having a PLCP header portion common to a 20M PHY frame is exchanged in a 40M channel frame exchange period and Rate and Length contained in a PLCP header common to the 20M PHY frame are properly set so as to include subsequent 40M channel frame exchange, the 40M channel frame exchange period can be covered seamlessly as a whole.

In addition, the 40M_ch period end frame F4 and 20M Ch_b release frame F5 may also be integrated into one 40M channel frame. In this case, since 20M STA and 20M MIMO STA cannot correctly decode the frame body of this 40M channel frame, they wait for an EIFS period defined for error recovery after the end of the period indicated by Data and Length. As a consequence, a wait period before 20M_ch_b access becomes longer than usual. In order to avoid this, the period indicated by Data and Length may be set to be shorter than the period originally occupied by the 40M channel frame. In addition, Rate and Length to be set in the PLCP header portion, of the 40M channel frame to be exchanged in a 40M channel frame exchange period, which is common to a 20M channel frame should be set so as not to exceed the end of an expected 40M period.

This arrangement can simplify PHY mode switching operation of 40M/20M MIMO AP from the operation shown in FIG. 6B to an operation similar to the PHY mode switching operation shown in FIG. 6C as well as decreasing the number of frames. Assume that when 40M/20M MIMO AP/STA and 40M/20M STA are to use 40M and 20M while switching them, whether 20M ch_a corresponds to the first or second half of 40M_ch is not determined for each AP but is determined as a specification so as to make the whole system operate according thereto. In this case, although each apparatus must use 20M_ch_a and 40M_ch while switching them, there is no need to consider the manner of using 20M_ch_b and 40M_ch, i.e., how to switch them. This may facilitate implementation.

Figure 7:
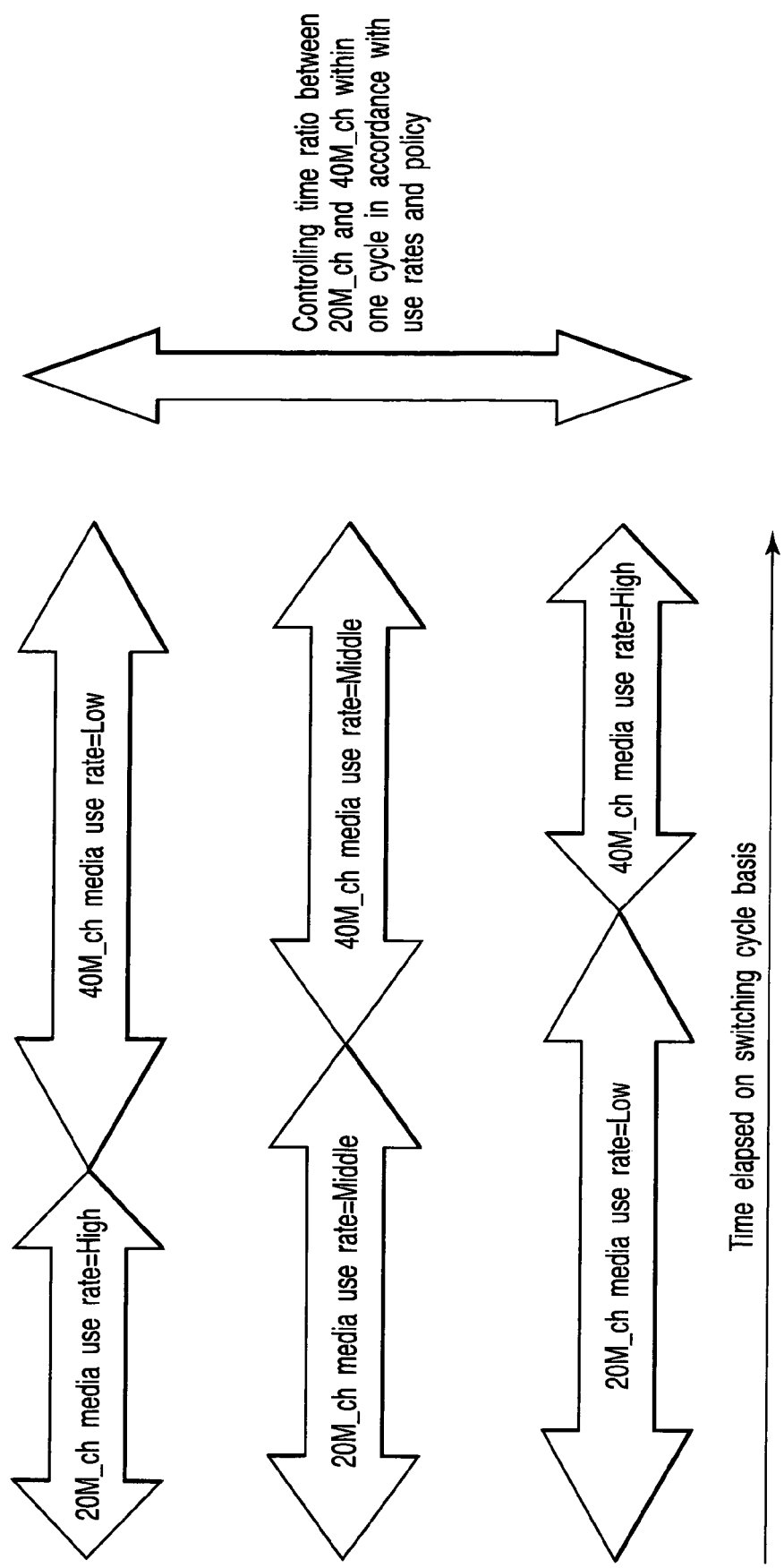
FIG. 7 is a view for explaining adaptive control in a period during which wireless communication is performed by using the first and second channels in the first embodiment of the present invention.

FIG. 7 shows an example of adaptive control on the time ratio between a 20M_ch period and a 40M_ch period. According to the scheme described with reference to FIGS. 6A to 6E, the channel state management device 23 in the base station 101 (40M/20M MIMO AP) controls the length of a period during which 20M_ch_a is used and the length of a period during which 40M_ch is used in the network 100. It is therefore necessary to determine times to be assigned to a 20M_ch period and 40M_ch period. Although these times may be simple fixed values, FIG. 7 exemplifies the method of controlling the time ratio between a 20M_ch period and a 40M_ch period on the basis of the network use rates in the 20M_ch period and 40M_ch period. In this case, the network use rates are defined as media use rates calculated from the ratios between the busy state and the idle state which are obtained from the carrier sense device 22 in the 20M_ch period and 40M_ch period.

A proper policy is provided to determine how to control the assignment of times to a 40M_ch period and 20M_ch period in accordance with media use rates. If, for example, an apparatus using 20M_ch and an apparatus using 40M_ch are to be allowed to use a medium as equally as possible, the time ratio is controlled in the middle direction in FIG. 7 (20M_ch media use rate=medium, 40M_ch media use rate=medium). If the apparatus using 40M_ch is to be prioritized over the apparatus using 20M_ch, the time ratio is controlled in the lower direction in FIG. 7 (20M_ch media use rate=low, 40M_ch media use rate=high). If the apparatus using 20M_ch is to be prioritized over the apparatus using 40M_ch, the time ratio is controlled in the upper direction in FIG. 7 (20M_ch media use rate=high, 40M_ch media use rate=low).

The channel state management device 23 in the base station 101 (40M/20M MIMO AP) decides the above time ratio on the basis of the information obtained from the carrier sense device 22 and the policy, thereby adaptively controlling 40M_ch and 20M_ch periods. The information necessary for the channel state management device 23 to obtain the above time ratio may be acquired from the carrier sense device 22 in the base station 101 (40M/20M MIMO AP) or may be acquired from the carrier sense devices in other terminals and collected in the channel state management device 23 in the base station 101.

In addition, the media use rates of 40M/20M MIMO STA and 40M/20M STA in a 20M_ch period may be measured. If the media use rates are high, the length of a 40M_ch period may be increased. The fact that terminals capable of performing communication through 40M_ch, like 40M/20M MIMO STA and 40M/20M STA, use a 20M_ch period much may indicate a high possibility that a 40M_ch period is shorter than requested. This control is effective for such a case.

Second Embodiment

Figure 8:
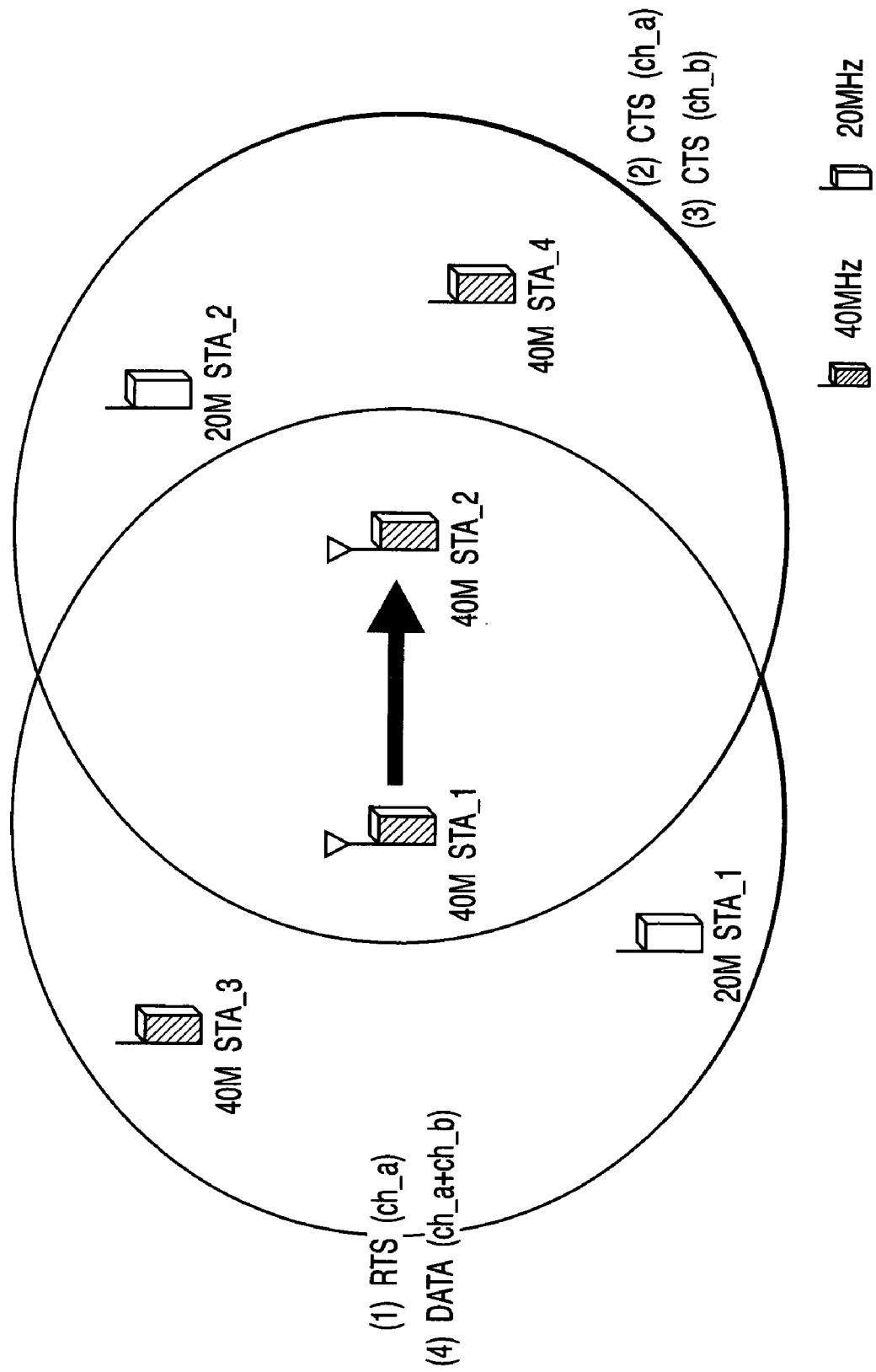
FIG. 8 is a view showing the arrangement of the first network according to a second embodiment of the present invention.
Figure 10:
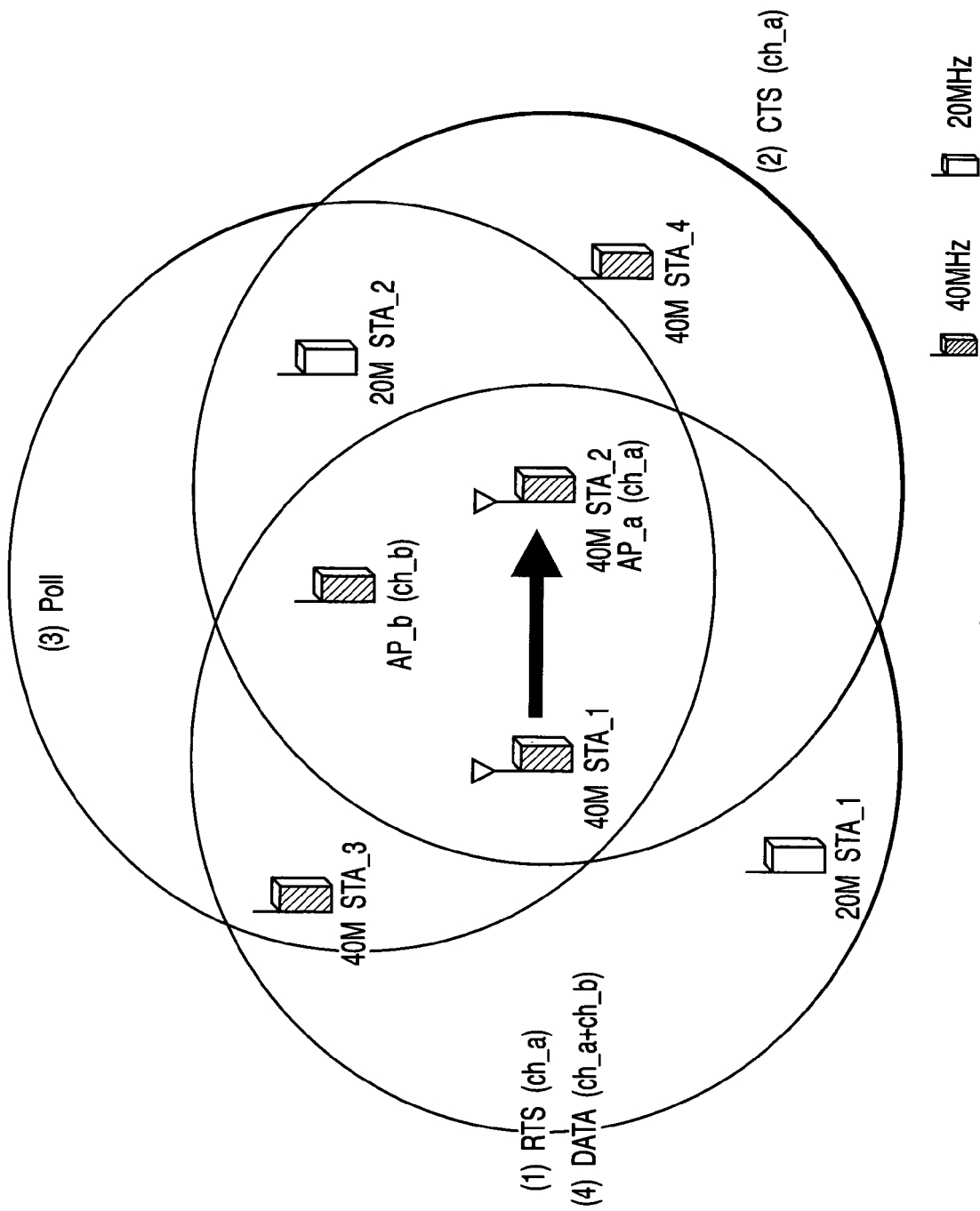
FIG. 10 is a view showing the second network arrangement according to the second embodiment of the present invention.

FIGS. 8 and 10 show a network arrangement according to the second embodiment of the present invention. Referring to FIGS. 8 and 10, 40M STA_1 tries to transmit a frame to 40M STA_2 by using a 40 MHz channel. 20M_ch_a and 20M_ch_b are respectively used in different Basic Service Sets (BSSs) to perform media access independently. Referring to FIGS. 8 and 10, consider a case wherein BSS_a to which 40M STA_1 is connected uses 20M_ch_a, and BSS_b which is adjacent to or overlaps BSS_a uses 20M_ch_b.

In 20M_ch_a, media access is made by DCF or EDCA. In 20M_ch_b, media access may be made by DCF or EDCA, or PCF or HCCA. FIG. 8 shows a case wherein media access is made by DCF or EDCA in both 20M_ch_a and 20M_ch_b. FIG. 10 shows a case wherein media access is made by DCF or EDCA in 20M_ch_a, and by PCF or HCCA in 20M_ch_b.

A physical mode and carrier sense state control in the network arrangement of this embodiment will be described with reference to FIGS. 9A and 9B and 11A and 11B.

First of all, 40M STA_1 performs carrier sense on 20M_ch_a, and waits until 20_ch_a is set in the idle state for a predetermined period of time (DIFS or AIFS). Upon detecting the idle state of 20M_ch_a for the predetermined period of time, 40M STA_1 starts countdown of a back off counter. When the back off counter becomes 0, 40M STA_1 transmits RTSa to 40M STA_2 by using 20M_ch_a, and waits for the reception of a frame from 40M STA_2.

Assume that RTSa includes an RTS frame defined by IEEE 802.11 and a frame sequence started by the frame, or a frame sequence obtained by extending it. The frame sequence may be extended so as to include information indicating that CTSb will be transmitted upon checking the idle state of another channel (20M_ch_b) as will be described above in addition to information indicating that CTSa will be transmitted to a channel (20M_ch_a) to which RTSa is transmitted. Another channel whose idle state is to be checked may be implicitly designated. If, for example, 40M_ch is defined by channel intervals of 40 MHz, 20M_ch to be paired with given 20M_ch is implicitly designated. Alternatively, another channel may be explicitly designated by an information element of RTSa. With regard to an apparatus which can only transmit/receive data through a single channel at once, a frame sequence may imply switching to the operation mode of a physical layer corresponding to another channel whose idle state is to be checked.

Upon receiving RTSa, 40M STA_2 returns CTSa to 40M STA_1 by using 20M_ch_a the SIFS time after the end of the reception of RTSa, thereby starting carrier sense on 20M_ch_b. If 40M STA_2 can only handle a single channel at once, it switches the operation mode of the physical layer to 20M_ch_b for carrier sense on 20M_ch_b. CTSa may be general CTS defined by IEEE 802.11, or may be a one that makes 40M STA_1 prepare for the reception of CTSb which is transmitted by a CTSa transmission source upon checking the idle state of another channel (20M_ch_b) as will be described later.

Each 40M STA which has received RTSa or CTSa transmitted through 20M_ch_a and each 20M STA belonging to BSS_a are inhibited from transmission until the scheduled time of the end of the transmission of the data frame. Assume that reservation of 20M_ch_a for 40M STA_1 is complete when 40M STA_1 receives CTSa from 40M STA_2 through 20M_ch_a. If 40M STA_1 can only handle a single channel at once, it switches the operation mode of the physical layer to 20M_ch_b.

Figure 9:
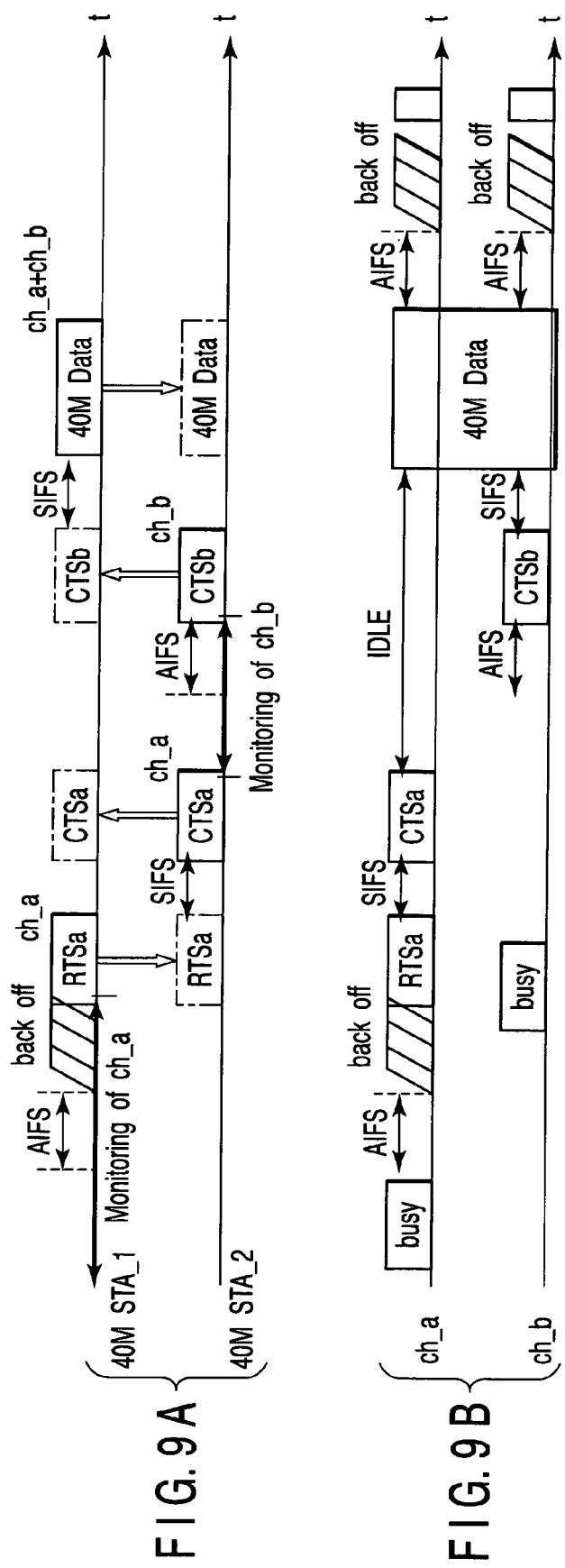
FIGS. 9A and 9B are timing charts for explaining a physical mode and carrier sense state control in the first network arrangement.

A case wherein BSS_b is performing DCF or EDCA will be described next with reference to FIGS. 8 to 9B.

When 40M STA_2 detects an idle state for the DIFS or AIFS time during carrier sense on 20M_ch_b, 40M STA_2 transmits CTSb to 40M STA_1 by using 20M_ch_b. If 40M STA_2 can only handle a single channel at once, it switches the operation mode of the physical layer to 40M_ch to receive an expected frame from 40M STA_1. Upon receiving CTSb, each 20M STA belonging to BSS_b is inhibited from transmission until the scheduled time of the end of the transmission of a data frame. Assume that reservation of 20M_ch_b for 40M STA_1 is complete when 40M STA_1 receives CTSa from 40M STA_2 through 20M_ch_b. 40M STA_1 therefore determines that both 20M_ch_a and 20M_ch_b were reserved, and transmits a data frame for a 40-MHz channel by using both 20M_ch_a and 20M_ch_b. In this case, if 40M STA_1 can only handle a single channel at once, it switches the operation mode of the physical layer to 40M_ch.

20M_ch_b may be kept busy after the reservation of 20M_ch_a, and may not be reserved-even after the lapse of a long period of time. If, therefore, 40M STA_1 does not receive CTSb through 20M_ch_b within a predetermined period of time after the reception of CTSa through 20M_ch_a, 40M STA_1 determines a timeout, and releases the transmission inhibited state of 20M_ch_a by RTS/CTS by transmitting NAV unlock frame through 20M_ch_a.

A case wherein BSS_b is performing PCF or HCCA will be described next with reference to FIGS. 10 to 11B.

When 40M STA_1 receives a Poll frame addressed to 40M STA_1 from AP_b of BSS_b in a period during which the 40M STA_1 waits for the reception of a frame from 40M STA_2 after the reception of CTSa through 20M_ch_a, 40M STA_1 transmits a data frame for a 40-MHz channel by using both 20M_ch_a and 20M_ch_b the SIFS time after the reception of the Poll frame.

Consider a case wherein in spite of the fact that 20M_ch_a has been reserved, a data frame for a 40-MHz channel cannot be transmitted even after the lapse of a long period of time, because it takes much time for 40M STA_1 to take a turn to execute polling through 20M_ch_b. In this case, therefore, if 40M STA_1 does not receive a Poll frame through 20M_ch_b within a predetermined period of time after the reception of CTS through 20M_ch_a, 40M STA_1 determines a timeout and transmits an NAV unlock frame through 20M_ch_a, thereby releasing the transmission inhibited state of 20M_ch_a by RTS/CTS.

As a scheme of making AP_b of BSS_b send a Poll frame addressed to 40M STA_1, for example, one of the following schemes may be used: a scheme of setting, in advance, the transmission of a Poll frame dedicated to 40M STA in a polling sequence in a predetermined cycle when performing polling in BSS_b; a scheme of recruiting 40M STA which wants to take a turn in a polling sequence when BSS_b starts polling; and a scheme of executing this 40M STA recruiting process in a predetermined cycle.

Alternatively, it suffices if a Poll frame from AP can be received early according to the following schemes. Assume that AP supports 40M band communication, and can perform communication through two channels at once by using 20M_ch_a and 20M_ch_b.

(Scheme 1): AP is prompted to transmit a Poll frame to allow 40M STA_1 to receive the Poll frame through 20M_ch_b within a predetermined period of time after ensuring 20M_ch_a.

(Scheme 2): 40M STA_1 ensures 20M_ch_a at the timing to receive a Poll frame through 20M_ch_b within a predetermined period of time after ensuring 20M_ch_a.

Scheme 1 will be described first. According to scheme 1, AP is made to send a Poll frame addressed to 40M STA_1 within a predetermined period of time after 40M STA_1 ensures 20M_ch_a. More specifically, 40M STA_1 transmits, to AP, a request frame for prompting the transmission of a Poll frame.

Figure 12:
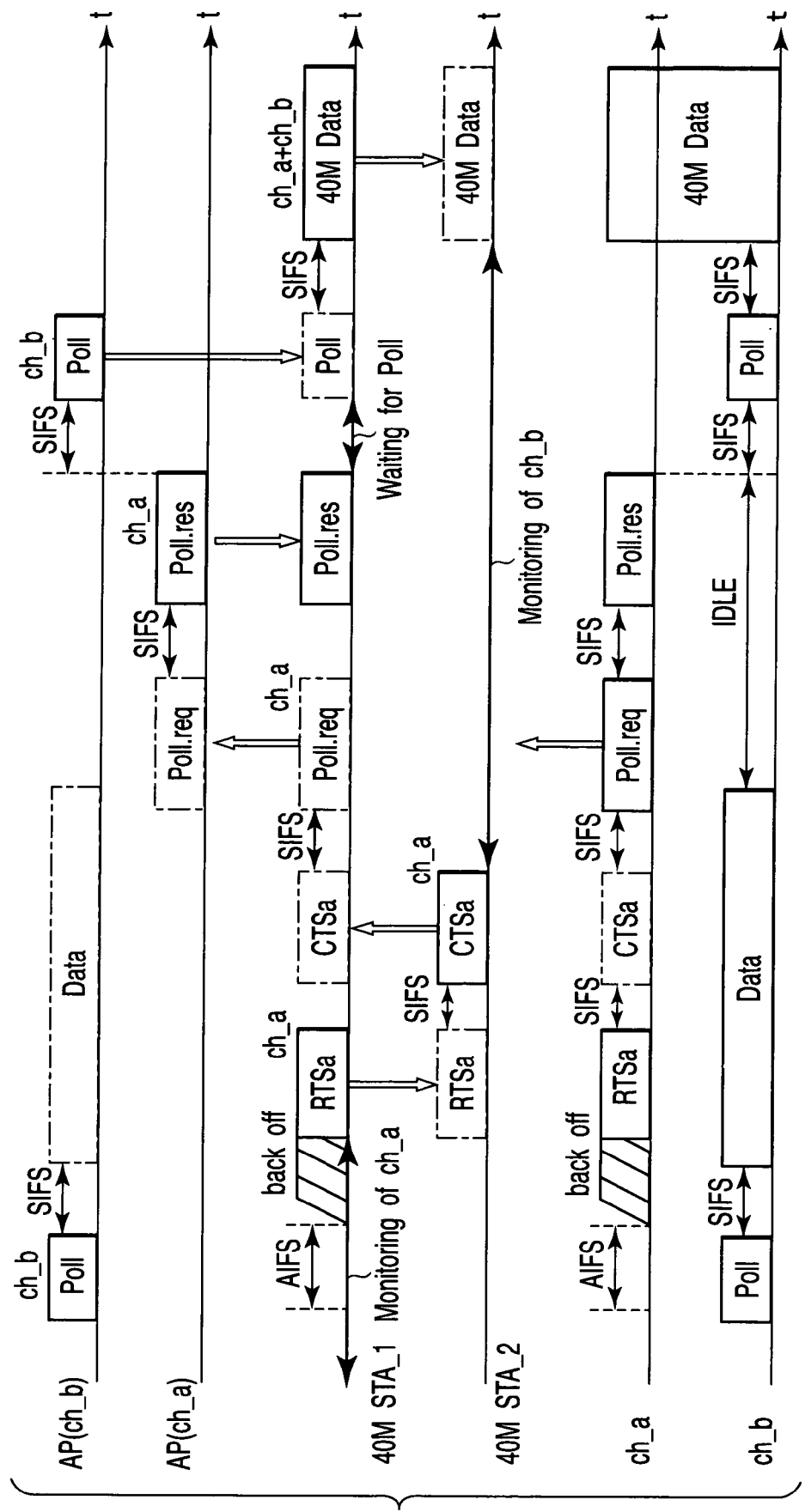
FIG. 12 is a chart showing the operation of exchanging frames when 40M STA_1 requests AP to transmit a Poll frame after RTS/CTS exchange.

FIG. 12 is a chart showing how frames are exchanged when 40M STA_1 requests AP to transmit a Poll frame after RTS/CTS exchange. Referring to FIG. 12, first of all, 40M STA_1 ensures 20M_ch_a by RTSa/CTSa exchange as in the case shown in FIGS. 11A and 11B. Thereafter, 40M STA_1 transmits, to AP, a Poll.req frame for requesting AP to transmit a Poll frame by using 20M_ch_a the SIFS time after the reception of CTSa. Upon receiving the Poll.req frame, AP performs scheduling to transmit the next Poll frame to 40M STA_1.

If AP has succeeded in scheduling and can transmit the next Poll frame to 40M STA_1, AP returns, to 40M STA_1, a Poll.res frame which indicates that a Poll frame can be transmitted, by using 20M_ch_a, the SIFS time after the reception of the Poll.req frame. Upon receiving the Poll.res frame from AP, 40M STA_1 starts waiting for a Poll frame. Upon receiving a Poll frame through 20M_ch_b, 40M STA_1 transmits data to 40M STA_2 on a 40M band using both 20M_ch_a and 20M_ch_b.

If AP has failed scheduling and cannot transmit the next Poll frame to 40M STA_1, AP transmits nothing to 40M STA_1. If no Poll.res frame is returned from AP after the lapse of the SIFS time since the transmission of the Poll.req frame, 40M STA_1 determines that it has failed to ensure 20M_ch_b, and transmits data to 40M STA_2 on a 20M band using only 20M_ch_a.

In this manner, after ensuring 20M_ch_a by RTS/CTS exchange between 40M STA_1 and 40M STA_2, 40M STA_1 performs Poll.req/Poll.res exchange with AP so as to request AP to transmit a Poll frame. This makes it possible for 40M STA_1 to receive a Poll frame through 20M_ch_b before the occurrence of a timeout after ensuring 20M_ch_a.

FIG. 13 is a chart showing the operation of exchanging frames when 40M STA_1 transmits Poll request information to AP upon adding it to RTS. Referring to FIG. 13, 40M STA_1 forms one frame (RTSa+Poll.req frame) by adding Poll request information addressed to AP to RTSa addressed to 40M STA_2, and transmits the frame by using 20M_ch_a.

Upon receiving the RTSa+Poll.req frame, 40M STA_2 returns CTSa for making a peripheral terminal set NAV to 40M STA_1 by using 20M_ch_a the SIFS time after the reception of the RTSa+Poll.req frame. Upon receiving the RTSa+Poll.req frame, AP recognizes from the Poll.req field of the RTSa+Poll.req frame that 40M STA_1 has requested a Poll frame, and performs scheduling to transmit the next Poll frame to 40M STA_1.

If AP has succeeded in scheduling and can transmit the next Poll frame to 40M STA_1, AP returns, to 40M STA_1, a Poll.res frame indicating that the Poll frame can be transmitted, by using 20M_ch_a, the SIFS time after the reception of the CTSa frame. Upon receiving the Poll.res frame from AP, 40M STA_1 starts waiting for a Poll frame. Upon receiving a Poll frame through 20M_ch_b, 40M STA_1 transmits data to 40M STA_2 on a 40M band using both 20M_ch_a and 20M_ch_b.

If AP has failed scheduling and cannot transmit the next Poll frame to 40M STA_1, AP returns nothing to 40M STA_1. If no Poll.res frame is returned from AP even after the lapse of the SIFS time since the reception of the CTSa frame, 40M STA_1 determines that it has failed to ensure 20M_ch_b, and transmits data to 40M STA_2 on a 20M band using only 20M_ch_a.

In this manner, by transmitting Poll frame request information to AP upon adding it to RTS, 40M STA_1 can receive a Poll frame through 20M_ch_b before the occurrence of a timeout after ensuring 20M_ch_a.

Figure 14:
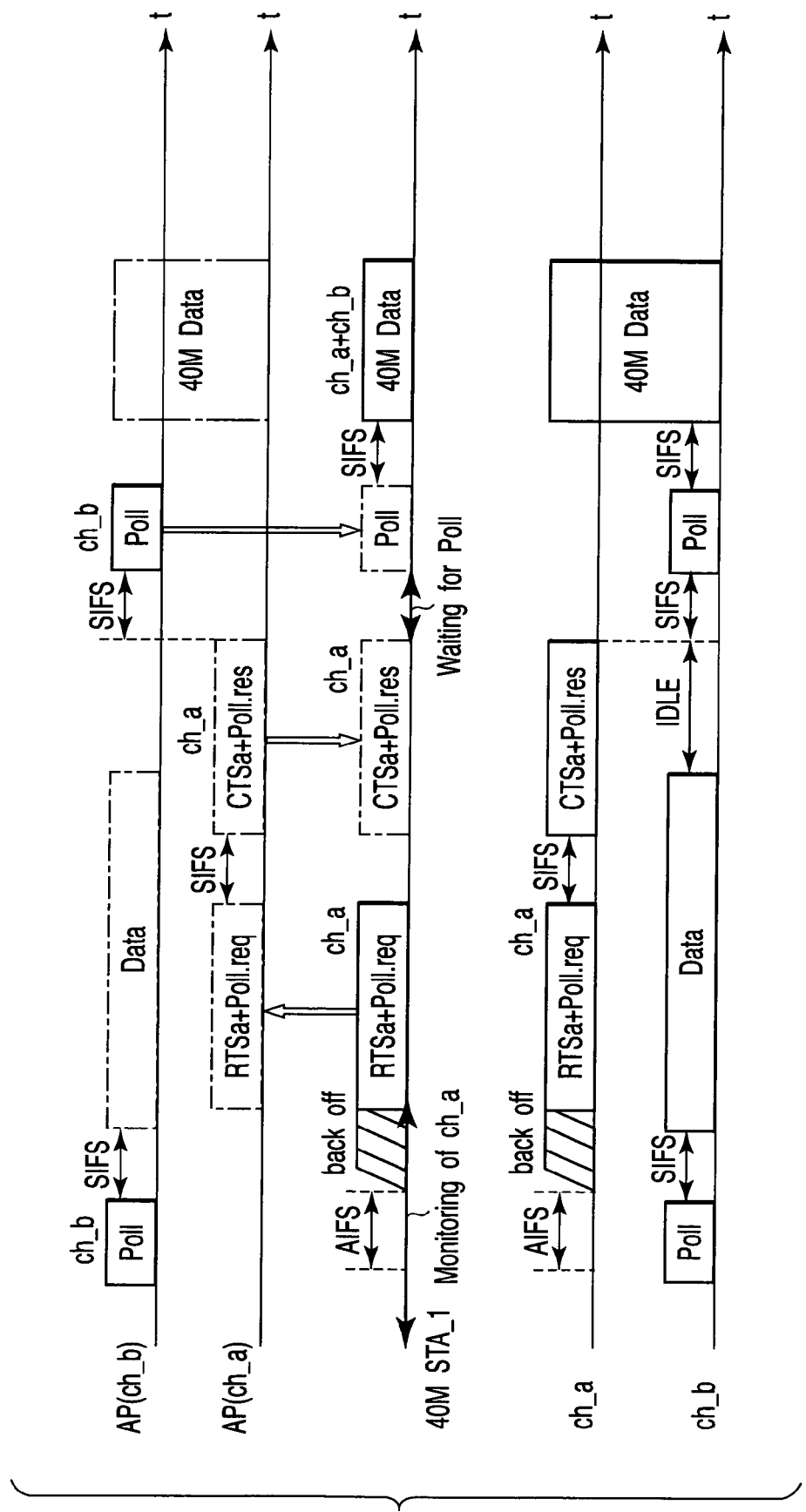
FIG. 14 is a chart showing the operation of exchanging frames when AP is a destination of data from 40M STA_1.

FIG. 14 is a chart showing the operation of exchanging frames when AP is a destination of data from 40M STA_1. In this case, since both RTSa and Poll.req are addressed to AP, 40M STA_1 can transmit Poll request information to AP upon adding it to RTSa. On the other hand, AP can also return Poll frame transmission enable information to 40M STA_1 upon adding it to CTSa.

Referring to FIG. 14, first of all, 40M STA_1 forms one frame (RTSa+Poll.req frame) by adding Poll request information to RTSa, and transmits it to AP by using 20M_ch_a. Upon receiving the RTSa+Poll.req frame, AP recognizes from the Poll.req field of the RTSa+Poll.req frame that 40M STA_1 requests a Poll frame, and performs scheduling to transmit the next Poll frame to 40M STA_1.

If AP has succeeded in scheduling and can transmit the next Poll frame to 40M STA_1, AP returns a CTSa+Poll.res frame to 40M STA_1 by using 20M_ch_a the SIFS time after the reception of the RTSa+Poll.req frame. The CTSa+Poll.res frame is obtained by adding Poll.res information, which indicates that AP can transmit a Poll frame to 40M STA_1, to CTSa and integrating them into one frame. Upon receiving the CTSa+Poll.res frame from AP, 40M STA_1 starts waiting for the reception of a Poll frame. Upon receiving a Poll frame through 20M_ch_b, 40M STA_1 transmits data to 40M STA_2 on a 40M band using both 20M_ch_a and 20M_ch_b.

If AP has failed scheduling and cannot transmit the next Poll frame to 40M STA_1, AP returns a CTSa frame to 40M STA_1. Upon receiving the CTSa frame, 40M STA_1 can know that 20M_ch_a was ensured. In addition, since no Poll.req information is added to the CTSa frame, 40M STA_1 determines that 20M_ch_b was not ensured, and transmits data to 40M STA_2 on a 20M band using only 20M_ch_a.

As described above, if AP is the destination of data from. 40M STA_1, RTSa+Poll.req/CTSa+Poll.res frames obtained by adding Poll request information (Poll.req)/Poll frame transmission enable information (Poll.res) to RTSa/CTSa frames are exchanged. This makes it possible to simultaneously ensure 20M_ch_a and set the destination of the next Poll frame to 40M STA_1. 40M STA_1 can receive a Poll frame through 20M_ch_b before the occurrence of a timeout after 20M_ch_a is ensured.

Scheme 2 will be described next. In scheme 2, 40M STA_1 ensures 20M_ch_a at the timing to receive a Poll frame from 20M_ch_b within a predetermined period of time after 20M_ch_a is ensured. 40M STA_1 ensures 20M_ch_a by transmitting RTS onto 20M_ch_a in accordance with the timing to receive a Poll frame from AP through 20M_ch_b.

First of all, 40M STA_1 which plans to transmit data by using a 40M band calculates a scheduled time at which the self-terminal will receive a Poll frame from AP. For example, each STA can calculate a scheduled time to receive a Poll frame from AP, by using schedule element information stored in a MAC frame such as an ADDTS response frame or schedule frame from an IEEE 802.11e wireless LAN system.

Subsequently, 40M STA_1 calculates, on the basis of a scheduled Poll frame reception time, an RTS transmission time which indicates when to transmit RTS through 20M_ch_a so as to reserve 20M_ch_a before receiving a Poll frame from AP through 20M_ch_b. When the RTS transmission time has been reached, 40M STA_1 performs carrier sense on 20M_ch_a. If 20M_ch_a is idle, 40M STA_1 transmits an RTS frame onto 20M_ch_a. If it is determined as the result of the carrier sense that 20M_ch_a is not idle, 40M STA_1 transmits data by using only 20M_ch_b the SIFS time after the reception of the Poll frame.

In this manner, 40M STA_1 reserves 20M_ch_a by transmitting RTS onto 20M_ch_a in accordance with the scheduled time at which 40M STA_1 receives a Poll frame from AP through 20M_ch_b. This prevents a previously reserved 20M_ch band from becoming idle for a long period of time until two 20_M_ch bands can be ensured, thereby ensuring a 40M band without wasting any band.

As described above, according to the second embodiment, letting 40M STA_1 ensure a 40-MHz channel makes it possible for the terminal in which a transmission frame is generated to ensure a channel in accordance with the transmission mode of the frame (whether to transmit through a 20M ch or 40M ch).

Third Embodiment

<EDCA>

According to the second embodiment described above, if 20M_ch_b cannot be reserved for a long period of time after the reservation of 20M_ch_a because 20M_ch_b is kept busy, i.e., if 40M STA_1 does not receive CTSb through 20M_ch_b within a predetermined period of time after receiving CTSa through 20M_ch_a, 40M STA_1 determines a timeout, and releases the transmission inhibited state of 20M_ch_a due to RTS/CTS by transmitting an NAV unlock frame through 20M_ch_a.

In contrast to this, according to the third embodiment of the present invention, if a 40M band cannot be ensured in this manner, a previously reserved 20M_ch band is prevented from being set in the idle state for a long period of time so as not to waste any band.

That is, in the third embodiment of the present invention, if 20M_ch_b cannot be reserved for a long period of time after the reservation of 20M_ch_a because 20M_ch_b is kept busy, and a timeout occurs, 40M STA_1 performs communication by using only 20M_ch_a, for which reservation has been succeeded, instead of releasing 20M_ch_a and aborting communication itself. For this purpose, 40M STA_1 corresponding to a transmitting terminal detects the lapse of a predetermined period of time after the completion of the reservation of 20M_ch_a (first channel), and starts communication using only a 20-MHz band through 20M_ch_a upon the lapse of the predetermined period of time.

Figure 15:
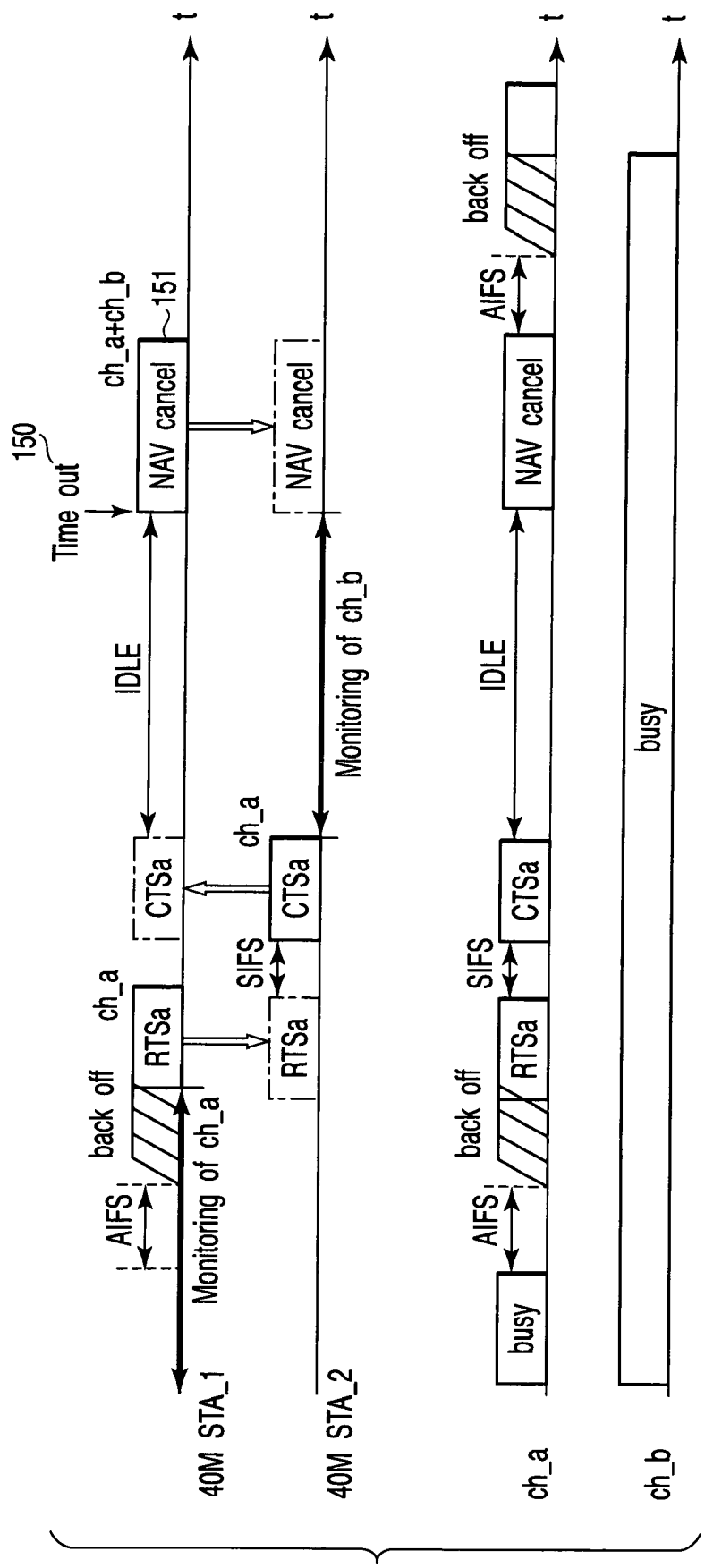
FIG. 15 is a chart for explaining a case wherein transmission is abandoned after the timeout of a 20M_ch_b reservation procedure.
Figure 16:
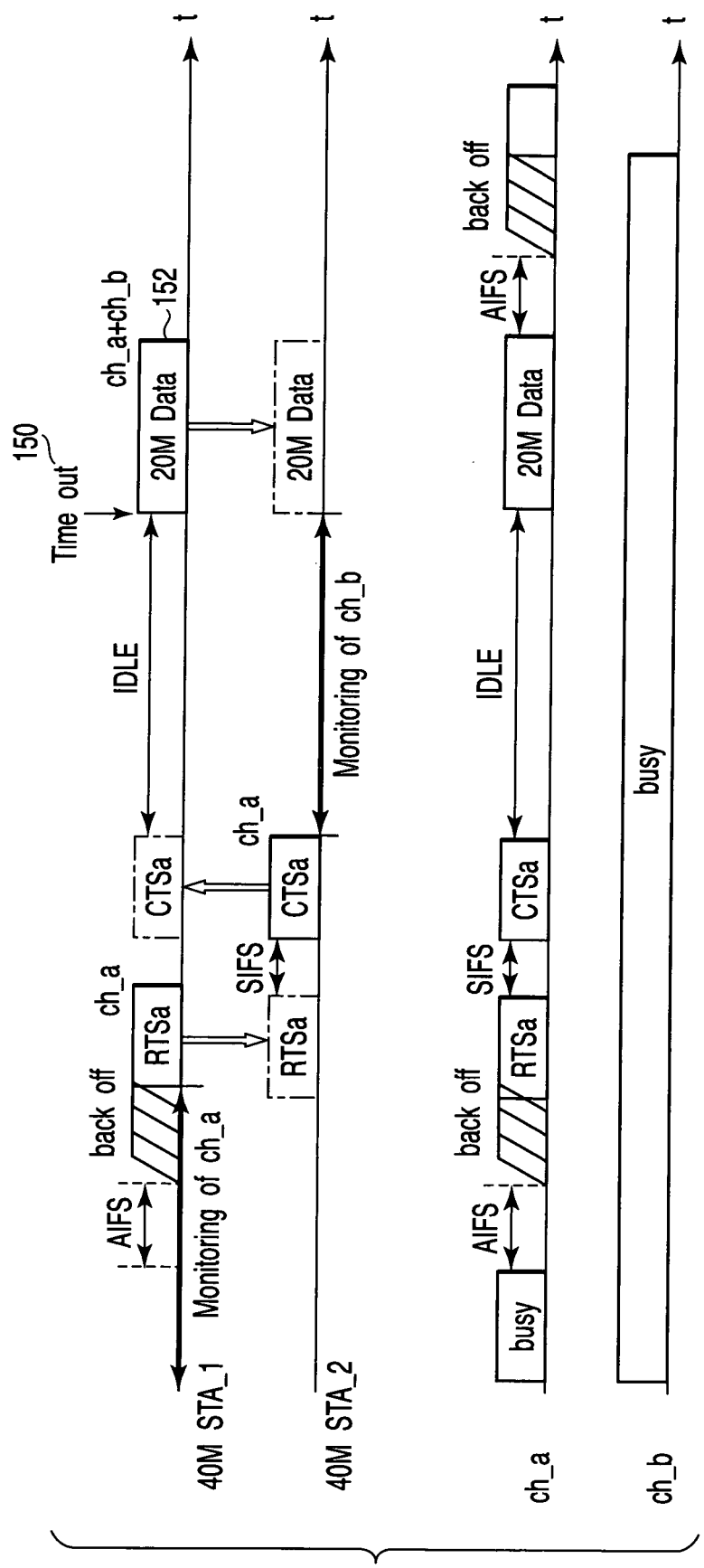
FIG. 16 is a chart for explaining a case wherein 20-MHz communication is started after the timeout of a 20M_ch_b reservation procedure according to a third embodiment of the present invention.

FIG. 15 is a chart for explaining a case wherein transmission is abandoned after the timeout of a reservation procedure for 20M_ch_b. FIG. 16 is a chart for explaining a case wherein 20-MHz communication is started after the timeout of a reservation procedure for 20M_ch_b according to the third embodiment of the present invention.

Referring to FIG. 15, 40M STA_1 transmits RTSa to 40M STA_2 by using 20M_ch_a, and receives CTSa from 40M STA_2, thereby succeeding in reserving 20M_ch_a. Thereafter, 40M STA_1 waits until CTSb is transmitted from 40M STA_2 through 20M_ch_b. As shown in FIG. 15, however, if 20M_ch_b is kept busy and a timeout 150 occurs without reversing 20M_ch_b even after the lapse of a long period of time, 40M STA_1 stops reservation of 20M_ch_b and releases 20M_ch_a. In this case, 40M STA_1 terminates all channel reservation procedures for data transmission by NAV cancel 151, and aborts communication with 40M STA_2. Thereafter, 40M STA_1 does not transmit held data until it wins a contention for channel acquisition against other terminals by back off again to obtain the next communication chance.

Assume that 40M STA_1 and 40M STA_2 share the same timeout value. Otherwise, there is a chance that NAV cancel transmitted by 40M STA_1 upon determination that 20M_ch_b is not idle may collide with CTSb transmitted by 40M STA_2 upon determining that 20M_ch_b is idle.

Although not shown, if 20_ch_b is kept busy and a timeout occurs without succeeding in reserving 20M_ch_b even after the lapse of a long period of time, 40M STA_2 may release 20N_ch_a. That is, 40M STA_2 transmits NAV cancel. In addition, after the timeout, 40M STA_2 may transmit, to 40M STA_1, a frame for requesting the transmission of NAV cancel. Upon receiving this frame, 40M STA_1 transmits NAV cancel. According to this method, 40M STA_2 always transmits a frame first in accordance with the monitoring result of 20M_ch_b, and hence there is no chance that frames coincide with each other, even if the precision of the timer is low.

Referring to FIG. 16 associated with the third embodiment of the present invention, if 20M_ch_b is kept busy and the timeout 150 occurs without succeeding in reserving 20M_ch_b even after the lapse of a long period of time, 40M STA_1 stops reservation of 20M_ch_b as in the case shown in FIG. 15, but keeps ensuring 20M_ch_a without releasing it. After the timeout 150, 40M STA_1 performs communication 152 with 40M STA_2 through a 20-MHz band using only 20M_ch_a. In such a case, the transmission rate becomes lower than that in 40-MHz communication using both 20M_ch_a and 20M_ch_b, but 40M STA_1 can transmit data without aborting communication with 40M STA_2.

Other terminals which are receiving RTSa/CTSa exchange between 40M STA_1 and 40M STA_2 through 20M_ch_a can detect, by using timers provided for the respective terminals, that 40M STA_1 has timed out and failed to reserve 20M_ch_b. Each terminal can therefore recognize that 40M STA_1 starts the 20-MHz communication 152 instead of 40-MHz communication, and update NAV for 40-MHz communication, which has been set by each terminal in advance, to a length for 20-MHz communication on the basis of Rate and Length stored in the header of a 20-MHz data frame addressed to 40M STA_2 which is transmitted from 40M STA_1. Even if, therefore, 40M STA_1 changes from 40-MHz communication, which has been planned to be performed at first, to 20-MHz communication, the above operation can prevent collision when other terminals transmit frames and interference with 20-MHz communication between 40M STA_1 and 40M STA_2.

In addition, the NAV length may be changed on the basis of the duration field contained in a MAC header instead of Rate and Length stored in the PHY header of a 20-MHz data frame transmitted from 40M STA_1 to 40M STA_2. This also applies to the case of HCCA to be described next.

<HCCA>

A case wherein 40M/20M MIMO AP serving as a base station in a network executes a scheme of assigning media access rights to the respective terminals by a polling scheme such as HCF Controlled Access (HCCA) will be described next.

In the second embodiment described above, if, in spite of the fact that 20M_ch_a has been reserved, a data frame for a 40-MHz channel cannot be transmitted even after the lapse of a long period of time, because it takes much time for 40M STA_1 to take a turn to execute polling through 20M_ch_b, i.e., if 40M STA_1 does not receive a Poll frame through 20M_ch_b within a predetermined period of time after receiving CTS through 20M_ch_a, 40M STA_1 determines a timeout, and releases the transmission inhibited state of 20M_ch_a due to RTS/CTS by transmitting an NAV unlock frame through 20M_ch_a.

In contrast, according to the third embodiment of the present invention, if 20M_ch_b is kept busy after the reservation of 20M_ch_a and a timeout occurs without succeeding in reserving 20M_ch_b even after the lapse of a long period of time, 40M STA_1 performs communication by using only 20M_ch_a, for which reservation has succeeded, instead of releasing 20M_ch_a and aborting communication itself, as in the above case of EDCA.

Figure 18:
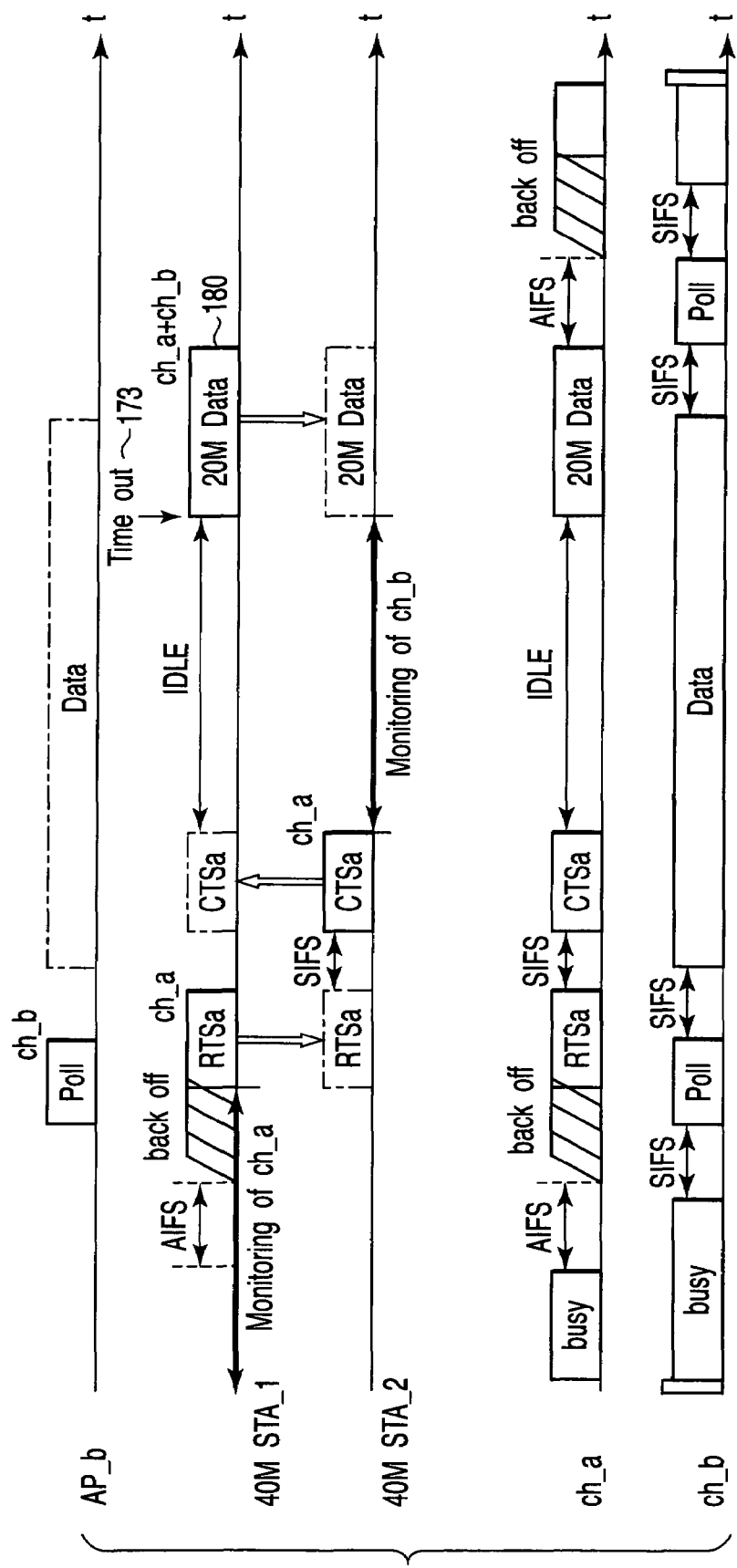
FIG. 18 is a chart for explaining a case wherein only 20-MHz communication is performed when a turn to execute polling on 20M_ch_b is not provided within a timeout time.

FIG. 17 is a chart for explaining a case wherein 40M STA_1 abandons transmission because it is not provided with a turn to execute polling on 20M_ch_b within the timeout time. FIG. 18 is a chart for explaining a case wherein 40M STA_1 starts only 20-MHz communication when it is not provided with a turn to execute polling on 20M_ch_b within the timeout time.

Referring to FIG. 17, 40M STA_1 transmits RTSa 170 to 40M STA_2 by using 20M_ch_a, and waits for the transmission of a Poll frame addressed to 40M STA_1 from AP_b in BSS_b through 20M_ch_b after succeeding in reserving 20M_ch_a by receiving CTSa 171 from 40M STA_2. As shown in FIG. 17, however, if a wait period 172, in 40M STA_1, for the reception of a frame from 40M STA_2 does not match the timing of the transmission of a Poll frame from AP_b, and 40M STA_1 undergoes a timeout 173 without receiving any Poll frame, 40M STA_1 stops ensuring of 20M_ch_b and releases 20M_ch_a. In this case, 40M STA_1 terminates all channel reservation procedures for data transmission by NAV cancel 174, and aborts communication with 40M STA_2. Thereafter, 40M STA_1 does not transmit held data until it wins a contention for acquisition of 20M_ch_a against other terminals by back off again to obtain the next communication chance.

Referring to FIG. 18 associated with the third embodiment of the present invention, if 20M_ch_b is kept busy and 40M STA_1 undergoes the timeout 173 without receiving any Poll frame even after the lapse of a long period of time, 40M STA_1 stops reservation of 20M_ch_b but keeps ensuring 20M_ch_a without releasing it, as in the case shown in FIG. 17. After the timeout 173, 40M STA_1 performs communication 180 with 40M STA_2 through a 20-MHz band using only 20M_ch_a for which reservation has succeeded. In this case, although the transmission rate becomes lower than that in 40-MHz communication using both 20M_ch_a and 20M_ch_b, 40M STA_1 can transmit data without aborting communication with 40M STA_2. In addition, other terminals which are receiving RTAa/CTSa exchange between 40M STA_1 and 40M STA_2 through 20M_ch_a can detect, by using timers provided for the respective terminals, that 40M STA_1 has timed out and failed to acquire a transmission chance through 20M_ch_b. Each terminal can therefore recognize that 40M STA_1 performs 20-MHz communication 180 instead of 40-MHz communication, and update NAV for 40-MHz communication, which has been set in advance, to a length for 20-MHz communication on the basis of Rate and Length stored in the header of a 20-MHz data frame addressed to 40M STA_2 which is transmitted from 40M STA_1. Even if, therefore, 40M STA_1 changes from 40-MHz communication, which has been planned to be performed at first, to 20-MHz communication, the above operation can prevent collision when other terminals transmit frames and interference with 20-MHz communication between 40M STA_1 and 40M STA_2.

According to the third embodiment of the present invention described above, even if all the 40M band cannot be ensured when communication using the 40M band is started, communication can be performed by using at least a 20M band which has been reserved in advance. This can prevent a 20M_ch band from being kept in the idle state for a long period of time and prevent any band from being wasted.

As is obvious from the above description, the third embodiment can be executed in combination with the first embodiment, and can also be executed in combination with the second embodiment. When the third embodiment is combined with the second embodiment, after the first channel is reserved, a transmitting terminal transmits, to a polling control terminal, a request frame for requesting the transmission of a Poll frame. Upon receiving a response frame corresponding to this request frame, the transmitting terminal waits for the reception of a Poll frame. In this case, if the transmitting terminal obtains transmission permission upon receiving the Poll frame, the terminal performs communication by using the second channel having the second frequency band. If the terminal receives no Poll frame from the control terminal even after the lapse of a predetermined time since the completion of reservation of the first channel, the terminal starts communication using the first channel having the first frequency band.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus, comprising:
a first physical layer protocol processing device configured to perform physical layer protocol processing for wireless communication using one first-channel of two first-channels, or other first-channel of the two first-channels, the first-channels each having a first bandwidth;
a second physical layer protocol processing device configured to perform physical layer protocol processing for wireless communication using a second-channel having a second bandwidth which is wider than the first bandwidth, and overlapping the two first-channels;
a state management device configured to determine whether or not the one first-channel satisfies a specific condition of determination of an idle state; and
a control device configured to perform control to, upon receiving a determination result which indicates that the one first-channel satisfies the specific condition of determination of the idle state, make the first physical layer protocol processing device transmit a first frame for occupation of the one first-channel for a first period,
the control device further configured to make the first physical layer protocol processing device or the second physical layer protocol processing device transmit a second frame for occupation of the other first-channel for a second period, after transmission of the first frame,
the control device still further configured to transmit a third frame for termination of occupation of the second-channel, after transmission of the second frame.

2. The apparatus according to claim 1, wherein the second frame includes a header which is decodable by reception terminals which perform wireless communication by using the other first-channel only.

3. The apparatus according to claim 1, wherein the control device is configured to perform control to make the second physical layer protocol processing device start exchanging frames by using the second-channel after transmission of the second frame.

4. The apparatus according to claim 1, further comprising:
a control device configured to perform control to generate a fourth frame which declares that an end of communication period during which the second-channel is used, and make the second physical layer protocol processing device transmit the fourth frame.

5. The apparatus according to claim 4, wherein the control unit is configured to perform control to make the fourth frame contain an instruction to switch from the second-channel to the one first-channel, and make the second physical layer protocol processing device transmit the fourth frame.

6. The apparatus according to claim 1, wherein the first predetermined period is a period required for a subsequent frame exchange sequence.

7. The apparatus according to claim 1, further comprising a network system management device configured to form part of a network and control the first physical layer protocol processing device so as to transmit a network attribute by using the one first-channel.

8. The apparatus according to claim 1, further comprising a network system management device configured to form part of a network and accept network connection control only through the one first-channel.

9. The apparatus according to claim 1, further comprising:
a channel state management device configured to measure a first use rate of the one first-channel and a second use rate of the second-channel and control a length of a period during which wireless communication is performed by using the one first-channel and a length of a period during which wireless communication is performed by using the second-channel, on the basis of the first and second use rates.

10. The apparatus according to claim 1, wherein the control unit is configured to perform control to make the first frame contain an instruction to switch from the one first-channel to the second-channel, and make the first physical layer protocol processing device transmit the first frame.

11. The apparatus according to claim 1, wherein the state management device determines that the specific condition of determination of the idle state is satisfied, when the one of the first-channels is kept in the idle state for a fixed period designated in advance.

12. The apparatus according to claim 1, wherein the state management device determines that the specific condition of determination of the idle state is satisfied, when one of the first-channels is kept in the idle state for a fixed period designated in advance and a period determined by a pseudo-random number.

13. The apparatus according to claim 1, wherein the state management device manages carrier sense states of the first-channels and a carrier sense state of the second-channel, and determines, on the basis of one of the carrier sense states of the first-channels currently used for wireless communication, whether or not the one first-channel satisfies the specific condition of determination of the idle state.

14. The apparatus according to claim 13, wherein the state management device regards a carrier sense state obtained by combining carrier sense states of the two first-channels as a carrier sense state of the second-channel.

15. The apparatus according to claim 1, wherein the second physical layer protocol processing device receives data frames through the second-channel, after the second physical layer protocol processing device has transmitted the third frame.

16. A wireless communication method, comprising:
determining whether or not one first-channel of two first-channels each having a first bandwidth satisfies a specific condition of determination of an idle state;
when the one first-channel satisfies the specific condition of determination of the idle state, transmitting a first frame for occupation of the one first-channel for a first period through the one first-channel;
transmitting, using a first physical layer protocol processing device configured to perform physical layer protocol processing for wireless communication using the one first-channel of the two first-channels, or other first-channel of the two first-channels, the first-channels each having a first bandwidth, or a second physical layer protocol processing device configured to perform physical layer protocol processing for wireless communication using a second-channel having a second bandwidth which is wider than the first bandwidth, and overlapping the two first-channels, a second frame for occupation of the other first-channel of the two first-channels for a second period, through the other first-channel after transmission of the first frame; and
transmitting a third frame for termination of occupation of the second-channel, after transmission of the second frame.

17. The method according to claim 16, further comprising:
generating a fourth frame which declares that an end of communication period during which a second-channel is used, and transmitting the fourth frame through the second-channel, the second-channel having a second frequency bandwidth which is wider than the first frequency bandwidth, and overlapping the two first-channels.

18. A wireless communication method, comprising:
monitoring frame transmission on one first-channel of two first-channels each having a first bandwidth;
when the one first-channel is in an idle state for a predetermined period, reserving the one first-channel by transmitting a specific frame;
reserving the other first-channel after the reservation of the one first-channel; and
transmitting data using a second-channel having a second frequency bandwidth which is wider than the first frequency bandwidth and overlapping the two first-channels, after reservation of the one first-channel and the other first-channel,
wherein
the frame transmission on the one first-channel is monitored by a transmitting terminal,
the one first-channel channel is reserved by exchanging transmission request/transmission request acknowledgement frames between the transmitting terminal and a destination terminal by using the one first-channel when the one first-channel is in an idle state for a predetermined period,
the other first-channel is monitored by the destination terminal which has received a transmission request frame through the one first-channel, and
when the other first-channel is in an idle state for a predetermined period, the other first-channel is reserved by the destination terminal by transmitting a transmission request acknowledgement frame using the other first-channel.

19. The method according to claim 18, further comprising:
permitting the transmitting terminal to use the other first-channel by transmitting a Poll frame from a polling control terminal which manages the other first-channel, using the other first-channel.

20. The method according to claim 19, further comprising:
causing the transmitting terminal to calculate a scheduled reception time to receive a Poll frame from the polling control terminal;

calculating a transmission time for a transmission request frame for reserving the first-channel so as to receive the Poll frame at the calculated scheduled reception time; and when the first-channel is in an idle state for a predetermined period, starting, from the transmission time, reservation of the channel by exchanging transmission request/transmission request acknowledgement frames between the transmitting terminal and a destination terminal by using the first-channel, and wherein the data is transmitted upon obtaining a transmission permission by receiving the Poll frame.

21. The method according to claim 19, wherein the transmitting terminal executes detecting the lapse of a predetermined time after completion of reservation of the one first-channel, and starting communication using the one first-channel only, if the Poll frame from the control terminal is not received until the lapse of the predetermined time.

22. The method according to claim 19, further comprising:

transmitting a request frame which requests transmission of the Poll frame from the transmitting terminal to the polling control terminal after the one first-channel is reserved; and causing the transmitting terminal to wait for reception of the Poll frame, upon receiving a response frame corresponding to the request frame, and wherein the data is transmitted upon obtaining a transmission permission by receiving the Poll frame.

23. The method according to claim 22, further comprising changing a channel to be used for transmission of the data, from the second-channel to the one first-channel, if a reception wait state for the response frame continues beyond a predetermined period.

24. The method according to claim 18, further comprising:

causing a polling control terminal to perform polling control for transmitting a Poll frame which gives a transmission permission to the transmitting terminal, in accordance with a polling schedule;

causing the transmitting terminal to transmit a transmission request frame which includes request information requesting that the Poll frame is transmitted from the polling control terminal;

causing the transmitting terminal to receive response information corresponding to the request information from the polling control terminal; and causing the transmitting terminal to wait for reception of the Poll frame, upon receiving the response information corresponding to the request information, and wherein the data is transmitted upon obtaining a transmission permission by receiving the Poll frame.

25. The method according to claim 24, further comprising changing a channel to be used for transmission of the data, from the second-channel to the one first-channel, if a reception wait state for the response information corresponding to the request information continues beyond a predetermined period.

26. The method according to claim 18, wherein the transmitting terminal executes detecting the lapse of a predetermined time after completion of reservation of the one first-channel, and at the lapse of the predetermined time, starting communication using the one first-channel only.

* * * * *